(12) United States Patent
Wallach

(10) Patent No.: US 11,681,594 B2
(45) Date of Patent: *Jun. 20, 2023

(54) MULTI-LANE SOLUTIONS FOR ADDRESSING VECTOR ELEMENTS USING VECTOR INDEX REGISTERS

(71) Applicant: Micron Technology, Inc., Boise, ID (US)

(72) Inventor: Steven Jeffrey Wallach, Dallas, TX (US)

(73) Assignee: Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/738,986

(22) Filed: May 6, 2022

(65) Prior Publication Data
US 2022/0261325 A1    Aug. 18, 2022

Related U.S. Application Data

(63) Continuation of application No. 16/417,526, filed on May 20, 2019, now Pat. No. 11,327,862.

(51) Int. Cl.
*G06F 11/26* (2006.01)
*G06F 11/22* (2006.01)
*G06F 9/30* (2018.01)

(52) U.S. Cl.
CPC .......... *G06F 11/26* (2013.01); *G06F 9/3001* (2013.01); *G06F 9/30036* (2013.01); *G06F 11/2236* (2013.01)

(58) Field of Classification Search
CPC .... G06F 11/26; G06F 9/3001; G06F 9/30036; G06F 11/2236
See application file for complete search history.

(56) References Cited

U.S. PATENT DOCUMENTS

| | | |
|---|---|---|
| 5,226,171 A | 7/1993 | Hall et al. |
| 5,511,210 A | 4/1996 | Nishikawa et al. |
| 6,269,435 B1 | 7/2001 | Dally et al. |
| 6,334,176 B1 | 12/2001 | Scales, III et al. |
| 7,793,084 B1 * | 9/2010 | Mimar ................ G06F 9/30036 |
| | | 712/236 |
| 11,281,464 B2 * | 3/2022 | Anderson ........... G06F 9/30112 |
| 11,327,862 B2 | 5/2022 | Wallach |
| 2002/0087846 A1 | 7/2002 | Nickolls et al. |

(Continued)

FOREIGN PATENT DOCUMENTS

WO    2019011653 A1    1/2019

OTHER PUBLICATIONS

International Search Report and Written Opinion, PCT/US2020/028805, dated Jul. 28, 2020.

(Continued)

*Primary Examiner* — Matthew M Kim
*Assistant Examiner* — Indranil Chowdhury
(74) *Attorney, Agent, or Firm* — Greenberg Traurig

(57) ABSTRACT

Disclosed herein are vector index registers for storing or loading indexes of true and/or false results of conditional operations using multiple lane processing in vector processors. Each of the vector index registers store multiple addresses for accessing multiple positions in operand vectors in various types of operations that can leverage multi-lane processing.

20 Claims, 8 Drawing Sheets

(56) References Cited

U.S. PATENT DOCUMENTS

| | | | |
|---|---|---|---|
| 2004/0006681 A1 | 1/2004 | Moreno et al. | |
| 2004/0153623 A1 | 8/2004 | Buchty et al. | |
| 2004/0250044 A1 | 12/2004 | Isomura | |
| 2006/0136700 A1 | 6/2006 | Barlow et al. | |
| 2006/0184765 A1 | 8/2006 | Krueger | |
| 2007/0033381 A1 | 2/2007 | Wilson | |
| 2008/0016320 A1 | 1/2008 | Menon et al. | |
| 2008/0046683 A1 | 2/2008 | Codrescu et al. | |
| 2010/0274988 A1* | 10/2010 | Mimar | G06F 9/3001 712/E9.023 |
| 2010/0312988 A1 | 12/2010 | Bjorklund et al. | |
| 2012/0060020 A1 | 3/2012 | Gonion et al. | |
| 2012/0166761 A1 | 6/2012 | Hughes et al. | |
| 2013/0166516 A1 | 6/2013 | Reid | |
| 2013/0185538 A1 | 7/2013 | Hung et al. | |
| 2013/0212354 A1 | 8/2013 | Mimar | |
| 2013/0246759 A1 | 9/2013 | Bradbury et al. | |
| 2013/0262833 A1 | 10/2013 | Gonion | |
| 2014/0013075 A1* | 1/2014 | Hagog | G06F 9/30185 712/4 |
| 2014/0019715 A1 | 1/2014 | Ould-ahmed-vall et al. | |
| 2014/0189293 A1 | 7/2014 | Gopal et al. | |
| 2014/0189323 A1 | 7/2014 | Bharadwaj et al. | |
| 2014/0281425 A1* | 9/2014 | Valentine | G06F 9/30018 712/225 |
| 2015/0046671 A1 | 2/2015 | Ould-ahmed-vall | |
| 2016/0011873 A1 | 1/2016 | Plotnikov | |
| 2016/0026607 A1 | 1/2016 | Codrescu et al. | |
| 2016/0092218 A1* | 3/2016 | Gonion | G06F 9/30072 712/7 |
| 2016/0092398 A1* | 3/2016 | Gonion | G06F 9/30036 712/7 |
| 2016/0124651 A1 | 5/2016 | Sankaranarayanan et al. | |
| 2016/0179520 A1 | 6/2016 | Jha et al. | |
| 2016/0179526 A1 | 6/2016 | Jha et al. | |
| 2016/0179537 A1 | 6/2016 | Kunzman et al. | |
| 2017/0031865 A1* | 2/2017 | Eyole | G06F 9/30032 |
| 2017/0177356 A1 | 6/2017 | Ould-ahmed-vall et al. | |
| 2017/0177359 A1* | 6/2017 | Ould-Ahmed-Vall | G06F 12/0862 |
| 2017/0177363 A1 | 6/2017 | Yount et al. | |
| 2017/0185412 A1 | 6/2017 | Mishra et al. | |
| 2017/0308141 A1 | 10/2017 | Anderson et al. | |
| 2018/0060072 A1* | 3/2018 | Derby | G06F 9/30021 |
| 2019/0004797 A1* | 1/2019 | Zbiciak | G06F 9/3004 |
| 2019/0004814 A1* | 1/2019 | Chen | G06F 9/3836 |
| 2019/0042253 A1 | 2/2019 | Eyole et al. | |
| 2019/0196825 A1* | 6/2019 | Grocutt | G06F 9/3013 |
| 2019/0205137 A1* | 7/2019 | Meadows | G06F 9/30145 |
| 2019/0340054 A1* | 11/2019 | Boettcher | G06F 9/30036 |
| 2019/0377690 A1* | 12/2019 | Anderson | G06F 9/30149 |
| 2020/0210199 A1 | 7/2020 | Ould-ahmed-vall | |
| 2020/0225953 A1 | 7/2020 | Magklis et al. | |
| 2020/0301875 A1* | 9/2020 | Wallach | G06F 9/3824 |
| 2020/0371792 A1 | 11/2020 | Wallach | |
| 2020/0371801 A1 | 11/2020 | Wallach | |
| 2020/0371802 A1* | 11/2020 | Wallach | G06F 9/355 |
| 2020/0371886 A1 | 11/2020 | Wallach | |
| 2020/0372099 A1* | 11/2020 | Anderson | G06F 9/3851 |
| 2021/0216318 A1* | 7/2021 | Langhammer | G06F 9/30032 |
| 2021/0216319 A1* | 7/2021 | Zbiciak | G06F 9/30014 |
| 2021/0294605 A1* | 9/2021 | Plotnikov | G06F 9/3838 |
| 2021/0357218 A1* | 11/2021 | Anderson | G06F 9/30036 |

OTHER PUBLICATIONS

International Search Report and Written Opinion, PCT/US2020/028806, dated Jul. 28, 2020.

International Search Report and Wirtten Opinion, PCT/US2020/028799, dated Jul. 30, 2020.

International Search Report and Wirtten Opinion, PCT/US2020/028798, dated Jul. 30, 2020.

* cited by examiner

300 loading, by vector load-store unit of vector processor, at least one operand vector and at least one operand scalar (e.g., each operand vector is stored in a respective dual-access operand vector register, each scalar is stored in a respective operand scalar register, and even positions in a vector are in lane 1 and odd positions are in lane 0)
302 performing, by the vector processor, a conditional test operation on the scalar(s) with an element at a lane 0 index position of the at least one operand vector (e.g., position "0", "2", etc.) according to a lane 0 count
304a performing, by the vector processor, a conditional test operation on the scalar(s) with an element at a lane 1 index position of the at least one operand vector (e.g., position "1", "3", etc.) according to a lane 1 count
304b result is TRUE? 306a result is TRUE? 306b storing, in lane 0 index position in VIR_TRUE, the position of the element of the loaded operand vector according to the lane 0 count
308a storing, in lane 1 index position in VIR_TRUE, the position of the element of the loaded operand vector according to the lane 1 count
308b storing, in lane 0 index position in VIR_FALSE, the position of the element of loaded operand vector according to the lane 0 count
310a storing, in lane 1 index position in VIR_FALSE, the position of the element of loaded operand vector according to the lane 1 count
310b

At least one count ≥ VL? 314

Lane 0 count + 2, Lan 1 count +2
312

At least one count ≥ VL? 314 loading from one or more of the VIRs, by the vector load-store unit, stored lane 0 and lane 1 positions of elements of one or more loaded operand vectors 316 iterating one or more vector operations over the elements of the one or more loaded operand vectors according to the loaded positions stored in the VIR(s) 318

FIG. 3

400 loading, by vector load-store unit of vector processor, at least two operand vectors (e.g., each operand vector is stored in a respective dual-access operand vector register, and even positions in a vector are in lane 0 and odd positions are in lane 1)
402 performing, by the vector processor, a conditional test operation with respective elements at similar lane 0 index positions of the at least two operand vectors (e.g., position "0", "2", etc.) according to a lane 0 count
404a performing, by the vector processor, a conditional test operation with respective elements at similar lane 1 index positions of the at least two operand vectors (e.g., position "0", "2", etc.) according to a lane 1 count
404b result is TRUE ? 406a result is TRUE ? 406b storing, in lane 0 index position in VIR_TRUE, the position of the elements of the loaded operand vectors according to the lane 0 count
408a storing, in lane 1 index position in VIR_TRUE, the position of the elements of the loaded operand vectors according to the lane 1 count
408b storing, in lane 0 index position in VIR_FALSE, the position of the elements of the loaded operand vectors according to the lane 0 count
410a storing, in lane 1 index position in VIR_FALSE, the position of the elements of the loaded operand vectors according to the lane 1 count
410b

At least one count ≥ VL ? 414

Lane 0 count + 2, Lane 1 count +2
412

At least one count ≥ VL ? 414 loading from one or more of the VIRs, by the vector load-store unit, stored lane 0 and lane 1 positions of elements of one or more loaded operand vectors 416 iterating one or more vector operations over the elements of the one or more loaded operand vectors according to the loaded positions stored in the VIR(s) 418

FIG. 4

MULTI-LANE SOLUTIONS FOR ADDRESSING VECTOR ELEMENTS USING VECTOR INDEX REGISTERS

RELATED APPLICATIONS

The present application is a continuation application of U.S. patent application Ser. No. 16/417,526, filed May 20, 2019, the entire disclosure of which application is hereby incorporated herein by reference.

FIELD OF THE TECHNOLOGY

In general, at least some embodiments disclosed herein relate to vector processors using multi-lane solutions. Also, at least some embodiments disclosed herein relate to registers in vector processors that use multi-lane solutions for storing addresses for accessing vectors.

BACKGROUND

A vector processor can be or include a central processing unit (CPU) that implements an instruction set containing instructions that operate on arrays of data of commonly referred to as vectors. This is different from a scalar processor, wherein instructions operate on single data items. Vector processors can greatly improve performance on certain workloads over scalar processor, notably numerical simulation and similar tasks. Vector processors appeared in the early 1970s and where a large part of supercomputing design through the 1970s into the 1990s. The rapid fall in the price-to-performance ratio of more conventional microprocessor designs, such as scalar processor designs, as led to less development and manufacturing of vector processors.

In general, conventional CPUs (e.g., scalar based CPUs) are able to manipulate a few pieces of data at a time, at most. For instance, such CPUs have an instruction that essentially provide adding A to B and store the result in C. The data for A, B and C is usually pointed to by passing in an address to a memory location that holds the data. Decoding this address and getting the data out of the memory takes some time, during which the CPU can sit idle waiting for the requested data to show up.

To reduce the amount of time consumed by these steps, more contemporary CPUs use a technique known as instruction pipelining in which the instructions pass through several sub-units in turn. The first sub-unit reads the address and decodes it, the next fetches the values at those addresses, and the next does the math itself. With pipelining, the CPU starts decoding the next instruction even before the first has left the CPU, similar to an assembly line. This way, the address decoder, and other mentioned parts are simultaneously and constantly in use. Because of the pipelining, any instruction takes the same amount of time to complete.

Vector processors improve on pipelining by, instead of pipelining merely the instructions, such processors also pipeline the data itself. Thus, instead of constantly having to decode instructions and then fetch the data needed to complete the instructions, the vector processor reads a single instruction from memory. This allows for reduced decoding time and reduced power consumption (e.g., one decode with vector processors instead of multiple decodes).

Vector processors as well as other types of processors, such as the commonly used scalar processors, include index registers for modifying operand addresses during the execution of a program or operation. Often indexes are used and beneficial for doing vector or array operations. The contents of an index register can be added to or subtracted from an immediate address to form an effective address of the actual data or operand. Commonly, instructions can test the index register and, if the test fails, the instructions can reset the start of the loop. In this situation an index register is used for loop control. Some instruction sets allow multiple index registers to be used.

In general, it is known to use scalar registers for indexing. However, there are many limitations associated with using a scalar register for indexing. And, some of these limitations can curb the performance of a processor using the index register. For example, to access multiple positions of an operand vector, a scalar index register needs to be incremented and each incrementation needs to be separately loaded by the processor to be used for accessing the operand vector.

BRIEF DESCRIPTION OF THE DRAWINGS

The present disclosure will be understood more fully from the detailed description given below and from the accompanying drawings of various embodiments of the disclosure.

FIGS. 3 and 4 each illustrates example multiple lane operations for building indexing vectors for storing in vector indexing registers for TRUE and FALSE results (e.g., "0" and "1" results) of a conditional test operation (registers VIR_TRUE and VIR_FALSE), in accordance with some embodiments of the present disclosure.

DETAILED DESCRIPTION

Figure 1:
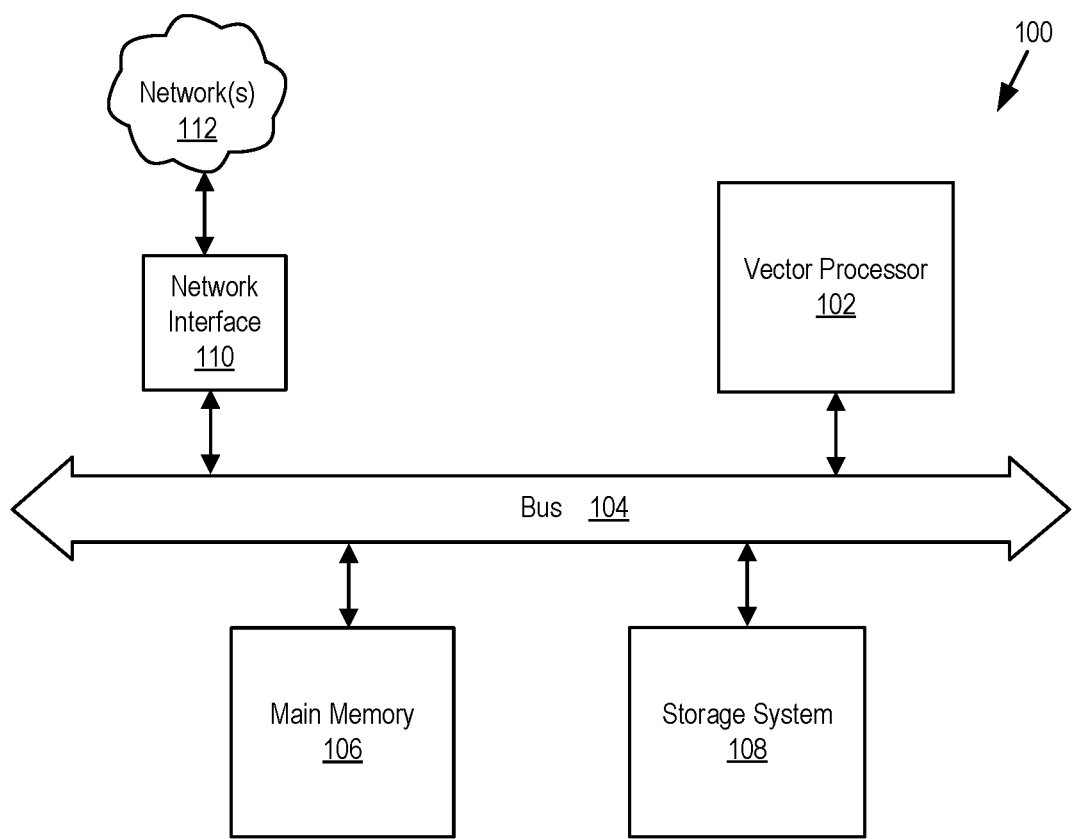
FIG. 1 illustrates example parts of an example computing device 100, in accordance with some embodiments of the present disclosure.

In general, at least some embodiments disclosed herein relate to vector processors using multi-lane solutions. Also, at least some of the embodiments disclosed herein include vector index registers in vector processors that each store multiple addresses for accessing multiple positions in operand vectors. And, in at least some of the embodiments disclosed herein, multi-lane solutions can enhance the storing of addresses by vector index registers and the accessing of multiple positions in operand vectors.

Also, at least some of the embodiments disclosed herein include vector index registers for TRUE and/or FALSE results of one or more conditional test operations (such as numerical comparisons) that each store multiple addresses for accessing multiple positions in operand vectors (VIR_TRUE and VIR_FALSE). Also, at least some embodiments described herein are directed to conditional operations in a vector processor having vector index registers VIR_TRUE and VIR_FALSE. Further, disclosed herein are processes of using VIR_TRUE and VIR_FALSE, including multi-lane processes, for more efficiently executing conditional operations in a vector processor.

In general, it is known to use a scalar index register in a vector processor to reference multiple positions of vectors by changing the value stored in the scalar index register during a vector operation. However, by using a vector indexing register for indexing multiple positions of one or more operand vectors, the scalar index register can be replaced and at least the continual changing of values in the scalar index register during a vector operation can be avoided. This is just one example of a technical solution to a technical problem described herein. Also, there are other limitations associated with using a scalar register or single-entry vector for indexing. And, some of these limitations can curb the performance of a vector processor using the index register. For example, to access multiple positions of an operand vector, a scalar or single-entry index register needs to be incremented and each incrementation needs to be separately loaded by the vector processor to be used for accessing the operand vector. However, by using a vector indexing register for indexing a plurality of positions of one or more operand vector registers, the scalar index register can be replaced and at least the continual changing of the scalar index register during a vector operation can be avoided.

Additionally, the performance of a vector processor can be enhanced even further by using vector indexing registers in combination with multi-lane solutions for storing addresses for accessing operand vectors. Also, the performance of a vector processor can be enhanced by using vector indexing registers in combination with multi-lane solutions for accessing operand vectors. This is especially the case when the vector processor performs conditional operations.

A vector operation for a vector processor can include a single vector or multiple vectors as input. Multiple lanes for the input can be used to accelerate the operation in parallel. For example, an operation may be the addition of vectors A and B, or element-wise multiplications vectors A and B, or any other type of operation on two or more vectors. Each vector of an operation can be separated into multiple lanes (k lanes) that are operated on in parallel. For example, consider the multiplication of $A(i) \times B(i)$ (i=0, 1, 2, ..., (n-1)*k). This can be done in k parallel lanes: $A(m) \times B(m)$ (m=k×i+j, and i=0, 1, 2, ..., n-1) for lane j=0, 1, 2, ..., k-1 in parallel. In general, the multiplication "X" can be replaced with another operation (e.g., addition, subtraction, bit-wise OR, etc.). The result of the operation on two or more vectors can be a scalar or a vector.

In general, with or without multi-lane solutions, a vector index register (VIR) can store address components for vector operations that use selective indexing. For example, using selective indexing, a VIR can store address parts $i\_1$, $i\_2$, ..., $i\_n$. This allows the operations on a vector register to move through elements $i\_1$, $i\_2$, ..., $i\_n$ of an input vector, instead of i, i+1, i+2, ..., i+n of the input vector. For example, using selective indexing, a VIR can store non-sequential address parts $i\_1$, $i\_3$, ..., $i\_8$. This allows the operations on a vector register to move through non-sequential elements of an input vector.

Specifically, with a multi-lane solution, multiple lanes can enhance selective indexing. With the use of multiple lanes, the time expended for selective indexing can at least be cut in half by dividing the selective indexing into at least two lanes. For example, using selective indexing and multiple lanes, a VIR can store address parts $i\_1$, $i\_2$, ..., $i\_n$ at least two at a time. In some embodiments, every other address part can be stored in an even position of the VIR, and the other address parts can be stored in odd positions of the VIR in parallel. By splitting storage positions into two groups, storage of data into the VIR can occur twice as fast. Also, multiple lanes allows the operations on a vector register to move through elements $i\_1$, $i\_2$, ..., $i\_n$ of an input vector at least twice as fast as well. The accessing of elements $i\_1$, $i\_2$, ..., $i\_n$ instead of i, i+1, i+2, ... i+n of the input vector can also occur by accessing every other address part stored in even positions and the other parts stored in odd positions in parallel, for instance. Using selective indexing and multiple lanes, a VIR can store non-sequential address parts $i\_1$, $i\_3$, ..., $i\_8$ and the processor can access such parts more quickly by splitting the processing into multiple lanes.

The technologies disclosed herein can at least provide support for basic or complex conditional operations. For example, the technologies can support the following basic conditional operation: if (A(i)>B (i)) A(i)=A (i)+B (i) else A(i)=A (i)−B (i). In such a basic conditional operation a single set of VIRs, VIR_TRUE and VIR_FALSE, can be used to perform the same operation more efficiently via the vector processor executing A(VIR_TRUE(j))=A(VIR_TRUE(j))+B(VIR_TRUE(j)) and A(VIR_FALSE(k))=A(VIR_FALSE(k))−B(VIR_FALSE(k)). Also, disclosed herein are systems that can support efficient implementations of conditional operations in a vector processor, such as conditional operations including, for example, if ('test condition') A(i)=A(i)+B(i) else A(i)=A(i)−B(i) using a pair of VIR_TRUE and VIR_FALSE. The results of the test conditions can also be used to set the indices in the two vector index registers, VIR_TRUE and VIR_FALSE.

The technologies disclosed herein can also enhance basic or complex conditional operations with the use of multiple lanes or multiple lane vector processing. In at least some embodiments, the technologies utilize a multi-lane solution for conditional operations in a vector processor having vector index registers VIR_TRUE and VIR_FALSE. The multi-lane solutions can more efficiently or quickly process vector conditional operations in a vector processor. This disclosure provides basic conditional operations as examples for showing the use of VIRs with multiple lane vector processing, but it is to be understood that the techniques disclosed herein can be used for more complex conditional operations. Also, for the most part, illustrated herein are two-lane vector processing solutions; however, it is to be understood that the techniques disclosed herein can also be applied to solutions with more than two lanes, such as four lane vector processing.

The following logic is a basic example of a conditional operation that can be processed by multiple lanes: if(A(i)>B (i)) A(i)=A(i)+B(i) else A(i)=A(i)−B(i). The example can be processed using two sets of TRUE and FALSE VIRs or one set of TRUE and FALSE VIRs that are dual access VIRs. For example, some embodiments can include four VIRs: VIR_TRUE_Lane_0 and VIR_FALSE_Lane_0, and VIR_TRUE_Lane_1 and VIR_FALSE_Lane_1. Or, for example, some embodiments can include VIR_TRUE split into two lanes, and VIR_FALSE split into two lanes. The example with the set of TRUE and FALSE VIRs each split into two lanes can be used to perform the conditional operation if(A(i)>B (i)) A(i)=A(i)+B(i) else A(i)=A(i)−B(i) more efficiently via executing:

A(Lane 0 of VIR_TRUE(j), Lane 1 of VIR_TRUE(j))=
A(Lane 0 of VIR_TRUE(j), Lane 1 of VIR_TRUE(j))+

B(Lane 0 of VIR_TRUE(j), Lane 1 of VIR_TRUE(j)), and
A(Lane 0 of VIR_FALSE(k), Lane 1 of VIR_FALSE(k))= A(Lane 0 of VIR_FALSE(k), Lane 1 of VIR_FALSE(k))− B(Lane 0 of VIR_FALSE(k), Lane 1 of VIR_FALSE(k)).

It is to be understood for the purposes of this disclosure that the test condition can be simple (e.g., "A(i)>0", or "A(i)>B(i)", or "A(i)>C(i)") or be more complex (e.g., "(A(i)>0 and A(i)>B(i)) or (A(i)>C(i))"). Thus, whether the test condition is simple or complex, a single set of VIR_TRUE and VIR_FALSE can be used to handle the two or more branches of operations selected via a conditional test operation (e.g., two branches of operations including: then "A(i)=A(i)+B(i)" else "A(i)=A(i)−B(i)").

It is to be understood for the purposes of this disclosure that a conditional test in general does not have to be testing ">". The test condition can be other types of numerical tests and/or Boolean operations.

In some embodiments, when there are complex tests and/or Boolean operations, it can be advantageous to use a Vm register to track the vector True and False values so that different TRUE and FALSE vectors can be combined to generate the final testing results. It can be complicated to translate complex Boolean operations into corresponding index operations such as VIR_TRUE and VIR_FALSE, so using a Vm as an intermediate indexing vector can be useful in some embodiments.

The index values or addressing components stored in a VIR (e.g., [2, 4, 5, 8] for accessing elements within an operand vector register (OVR) can be converted to memory addresses (e.g., the base address plus increments for each memory unit). Thus, the outputs described herein, such as the outputs from the multiplexors described herein can be converted to memory addresses for accessing vectors in main memory directly, in a way similar to accessing operand vector registers (OVRs).

In some embodiments, the techniques disclosed herein can provide a method utilizing VIRs and multi-lane vector processing. The lanes in the processing in the method can be implemented by even and odd positions in the operand vectors. In other words, even positions in each operand vector can be in a first lane and odd positions in each operand vector can be in a second lane from example. Also, the operand vector registers used in the method can be dual-access operand vector registers. Alternatively, multiplexors can be used to achieve similar functionality in the method without dual-access operand vectors. However, such examples using regular operand vector registers can have more complex circuit design than examples using dual-access operand vector registers or multi-access operand vector registers.

The method can include loading, by a vector load-store unit of a vector processor, one or more operand vectors. Each vector of the one or more operand vectors being stored in a respective operand vector register. The method can also include performing, by the vector processor, a conditional test operation on each element at a first lane index position of at least one of the loaded one or more operand vectors according to a first lane count stored in a first lane counter register. The conditional test operations can provide a vector of test results.

The method can also include storing, in a first lane index position in a first vector index register for each TRUE result of TRUE results of the conditional test operation (VIR_TRUE), a position of the TRUE result in the vector of test results according to the first lane count. The method can also include storing, in a first lane index position in a second vector index register for each FALSE result of FALSE results of the conditional test operation (VIR_FALSE), a position of the FALSE result in the vector of test results according to the first lane count.

The method can also include performing, by the vector processor, the conditional test operation on each element at a second lane index position of at least one of the loaded one or more operand vectors according to a second lane count stored in a second lane counter register. And, the method can include storing, in a second lane index position in the VIR_TRUE, a position of the TRUE result in the vector of test results according to the second lane count, as well as storing, in a second lane index position in the VIR_FALSE, a position of the FALSE result in the vector of test results according to the second lane count.

The method can also include performing a first vector operation on first elements in the one or more operand vectors. The first elements identified by positions stored in the VIR_TRUE. The method can also include performing a second vector operation on second elements in the one or more operand vectors. The second elements identified by positions stored in the VIR_FALSE.

The method can also include loading, by a vector load-store unit, a first input operand vector stored in a first input operand vector register, as well as loading, by the vector load-store unit, a second input operand vector stored in a second input operand vector register. The method can also include loading from the VIR_TRUE, by the vector load-store unit, a stored position of respective elements of the loaded first and second input operand vectors according to a first lane count, as well as loading from the VIR_TRUE, by the vector load-store unit, a stored position of respective elements of the loaded first and second input operand vectors according to a second lane count. The method can also include executing a first operation over the respective elements of the loaded first and second input operand vectors according to the loaded positions from the first lane and the second lane in the VIR_TRUE. In such examples, the first input operand vector register can be a dual-access operand vector register, and the second input operand vector register can be a dual-access operand vector register.

The method can also include storing the result of the first operation into an output operand vector register at positions that correspond to the loaded positions from the first and second lanes in the VIR_TRUE. The method can also include continuing to execute the first operation over respective elements of the loaded first and second input operand vectors according to loaded positions from the first lane and the second lane in the VIR_TRUE and to store the results of the first operation into the output operand vector register at the corresponding positions that match the loaded positions from the VIR_TRUE, until the first lane count or the second lane count exceeds or equals the length of the VIR_TRUE. Further, the method can include resetting the first lane count and the second lane count when the first lane count or the second lane count exceeds or equals the length of the VIR_TRUE. In such examples, the first lane count and the second lane count can each be incremented by two per loaded position from the VIR_TRUE.

The method can also include, subsequent to resetting the first lane count and the second lane count, loading from the VIR_FALSE, by the vector load-store unit, a stored position of respective elements of the loaded first and second input operand vectors according to the first lane count. Also, subsequent to resetting the first lane count and the second lane count, the method can include loading from a VIR_FALSE, by the vector load-store unit, a stored position of respective elements of the loaded first and second input operand vectors according to the second lane count. The method can also include executing a second operation over the respective elements of the loaded first and second input operand vectors according to the loaded positions from the first lane and the second lane in VIR_FALSE. The method can also include continuing to execute the second operation over respective elements of the loaded first and second input operand vectors according to loaded positions from the first lane and the second lane in the VIR_FALSE and to store the results of the first operation into the output operand vector register at the corresponding positions that match the loaded positions from the VIR_FALSE, until the first lane count or the second lane count exceeds or equals the length of the VIR_FALSE.

In such examples, the first lane count and the second lane count can each be incremented by two per loaded position from the VIR_FALSE. Also, in such examples, the first and second operations can each include various types of numerical operations. For example, the first operation can include addition and the second operation can include subtraction.

In some embodiments, the technologies disclosed herein can provide a system utilizing VIRs and multi-lane vector processing. The system can include a vector processor, configured to perform a conditional test operation on elements of a first loaded operand vector and a second loaded operand vector using two lanes within each of the first and second loaded operand vectors. The lanes in the processing by the system can be implemented by even and odd positions in the operand vectors. Also, the operand vector registers used in the system can be dual-access operand vector registers. Alternatively, multiplexors can be used to achieve similar functionality in the system without dual-access operand vectors. However, such examples using regular operand vector registers can have more complex circuit design than examples using dual-access operand vector registers or multi-access operand vector registers. For example, dual-access operand vector registers can be used in embodiments having two-lane processing. And, for example, quad-access operand vector registers can be used in embodiments having four-lane processing. Using additional multiplexors instead of multiple-access operand vector registers for multiple-lane processing can make the circuit design less elegant.

The system can also include a first lane counter of the vector processor, configured to store a first lane count. The system can also include a second lane counter of the vector processor, configured to store a second lane count. Performance of the conditional test operation by the vector processor can be according to the first lane count and the second lane count.

The system can also include one or more operand vectors registers of the vector processor. Each operand vector register can be configured to store an operand vector. The system can also include a first vector index register for each TRUE result of TRUE results of the conditional test operation (VIR_TRUE). Also, system can include a second vector index register for each FALSE result of FALSE results of the conditional test operation (VIR_FALSE).

In the system, the vector processor can be configured to load one or more operand vectors from the one or more operand vector registers. It can also be configured to perform a conditional test operation on each element at a first lane index position of at least one of the loaded one or more operand vectors according to a first lane count stored in the first lane counter as well as perform the conditional test operation on each element at a second lane index position of at least one of the loaded one or more operand vectors according to a second lane count stored in the second lane counter. The conditional test operations can provide a vector of test results. It can also be configured to store, in a first lane index position in the VIR_TRUE, a position of the TRUE result in the vector of test results according to the first lane count, as well as store, in a first lane index position in the VIR_FALSE, a position of the FALSE result in the vector of test results according to the first lane count. It can also be configured to store, in a second lane index position in the VIR_TRUE, a position of the TRUE result in the vector of test results according to the second lane count, as well as store, in a second lane index position in the VIR_FALSE, a position of the FALSE result in the vector of test results according to the second lane count.

The vector processor in the system can also be configured to perform the operations of the aforesaid method. For example, the vector processor is further configured to load, by a vector load-store unit of the vector processor, a first input operand vector stored in a first input operand vector register, as well as load, by the vector load-store unit, a second input operand vector stored in a second input operand vector register. Also, the vector processor is further configured to load from the VIR_TRUE, by the vector load-store unit, a stored position of respective elements of the loaded first and second input operand vectors according to a first lane count, as well as load from the VIR_TRUE, by the vector load-store unit, a stored position of respective elements of the loaded first and second input operand vectors according to a second lane count. The vector processor can also be configured to execute a first operation over the respective elements of the loaded first and second input operand vectors according to the loaded positions from the first lane and the second lane in the VIR_TRUE, as well as store the result of the first operation into an output operand vector register at positions that correspond to the loaded positions from the first and second lanes in the VIR_TRUE. It can also be configured to continue to execute the first operation over respective elements of the loaded first and second input operand vectors according to loaded positions from the first lane and the second lane in the VIR_TRUE and to store the results of the first operation into the output operand vector register at the corresponding positions that match the loaded positions from the VIR_TRUE, until the first lane count or the second lane count exceeds or equals the length of the VIR_TRUE. It can also be configured to reset the first lane count and the second lane count when the first lane count or the second lane count exceeds or equals the length of the VIR_TRUE. The first lane count and the second lane count can each be incremented by two per loaded position from the VIR_TRUE.

The vector processor can also be further configured to, subsequent to resets of the first lane count and the second lane count, load from the VIR_FALSE, by the vector load-store unit, a stored position of respective elements of the loaded first and second input operand vectors according to the first lane count. It can also be configured to load from a VIR_FALSE, by the vector load-store unit, a stored position of respective elements of the loaded first and second input operand vectors according to the second lane count. It can also be configured to execute a second operation over the respective elements of the loaded first and second input operand vectors according to the loaded positions from the first lane and the second lane in VIR_FALSE. It can also be configured to continue to execute the second operation over respective elements of the loaded first and second input operand vectors according to loaded positions from the first lane and the second lane in the VIR_FALSE and to store the results of the first operation into the output operand vector register at the corresponding positions that match the loaded positions from the VIR_FALSE, until the first lane count or the second lane count exceeds or equals the length of the VIR_FALSE. The first lane count and the second lane count can each be incremented by two per loaded position from the VIR_FALSE.

In some embodiments, the technologies disclosed herein can provide a vector processor utilizing VIRs and multi-lane vector processing. The vector processor can include an operand scalar register (OSR) configured to store an element to be used as input for an operation of an arithmetic logic unit (ALU). The processor can include a first operand vector register (OVR) and a second OVR of a plurality of operand vector registers. Each OVR can be configured to store elements of an operand vector to be used as input for an operation of an ALU. Each OVR can be a dual-access OVR.

The vector processor can also be configured to perform a conditional test operation on elements of the first OVR and the second OVR according to a first lane count stored in the first lane count register and a second lane count stored in a second lane count register. Also, the vector processor can be configured to perform a conditional test operation on an element stored in the OSR and elements of the first OVR according to a first lane count stored in the first lane count register and a second lane count stored in a second lane count register. The conditional test operations can provide a vector of test results.

The vector processor can also include a first vector index register (VIR_TRUE) configured to store, in a first lane index position in the VIR_TRUE, a position of a TRUE result in the vector of test results according to the first lane count, as well as store, in a second lane index position in the VIR_TRUE, a position of a TRUE result in the vector of test results according to the second lane count. The processor can also include a second vector index register (VIR_FALSE) configured to store, in a first lane index position in the VIR_FALSE, a position of a FALSE result in the vector of test results according to the first lane count, as well as store, in a second lane index position in the VIR_FALSE, a position of a FALSE result in the vector of test results according to the second lane count. Also, with such embodiments, the vector processor can be configured to perform the operations of the aforesaid method.

The applications of the combination of VIRs and multi-lane vector processing are many. In general, the embodiments disclosed herein can provide specific technical solutions to at least the technical problems mentioned in the background section and other parts of the application as well as other technical problems not described herein but recognized by those of skill in the art.

FIG. 1 illustrates example parts of an example computing device 100, in accordance with some embodiments of the present disclosure. The device 100 can be communicatively coupled to one or more networks 112, as shown. The device 100 includes a vector processor 102 that is in accordance with some embodiments of the present disclosure. The device 100 also includes at least a bus 104, a main memory 106, a data storage system 108, and a network interface 110. The bus 104 communicatively couples the vector processor 102, the main memory 106, the data storage system 108, and the network interface 110. The device 100 includes a computer system that includes at least vector processor 102, main memory 106 (e.g., read-only memory (ROM), flash memory, dynamic random access memory (DRAM) such as synchronous DRAM (SDRAM) or Rambus DRAM (RDRAM), static random access memory (SRAM), etc.), and data storage system 108, which communicate with each other via bus 104 (which can include multiple buses).

To put it another way, FIG. 1 is a block diagram of an example device 100 having a computer system in which embodiments of the present disclosure can operate. In some embodiments, the computer system can include a set of instructions, for causing a machine to perform any one or more of the methodologies discussed herein, when executed. In such embodiments, the machine can be connected (e.g., networked via network interface 110) to other machines in a LAN, an intranet, an extranet, and/or the Internet (e.g., network(s) 112). The machine can operate in the capacity of a server or a client machine in client-server network environment, as a peer machine in a peer-to-peer (or distributed) network environment (such as the peer-to-peer networks described herein), or as a server or a client machine in a cloud computing infrastructure or environment.

Vector processor 102 represents one or more vector processors that are in accordance with some embodiments of the present disclosure. The vector processor 102 can include a microprocessor, a central processing unit, or the like. More particularly, the vector processor 102 can include a complex instruction set computing (CISC) microprocessor, reduced instruction set computing (RISC) microprocessor, very long instruction word (VLIW) microprocessor, or a processor implementing other instruction sets, or processors implementing a combination of instruction sets, as long as the processor uses: vector instructions, vector registers, a vector first and multi-lane configuration. The vector processor 102 can also be one or more special-purpose processing devices such as an application specific integrated circuit (ASIC), a field programmable gate array (FPGA), a digital signal processor (DSP), graphics processing unit (GPU), network processor, or the like. The vector processor 102 can be configured to execute instructions for performing the operations and steps discussed herein. The vector processor 102 can further include a network interface device such as network interface 110 to communicate over one or more communications network (such as network(s) 112).

The data storage system 108 can include a machine-readable storage medium (also known as a computer-readable medium) on which is stored one or more sets of instructions or software and can embody at least some aspects of one or more of the methodologies or functions described herein. The data storage system 108 can include non-volatile storage. The instructions can also reside, completely or at least partially, within the main memory 106 and/or within the vector processor 102 during execution thereof by the computer system, the main memory 106 and the vector processor 102 also can constitute a machine-readable storage media. While the memory, vector processor, and data storage parts are shown in the example embodiment to each be a single part, each part should be taken to include a single part or multiple parts that can store the instructions and perform their respective operations. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Figure 2:
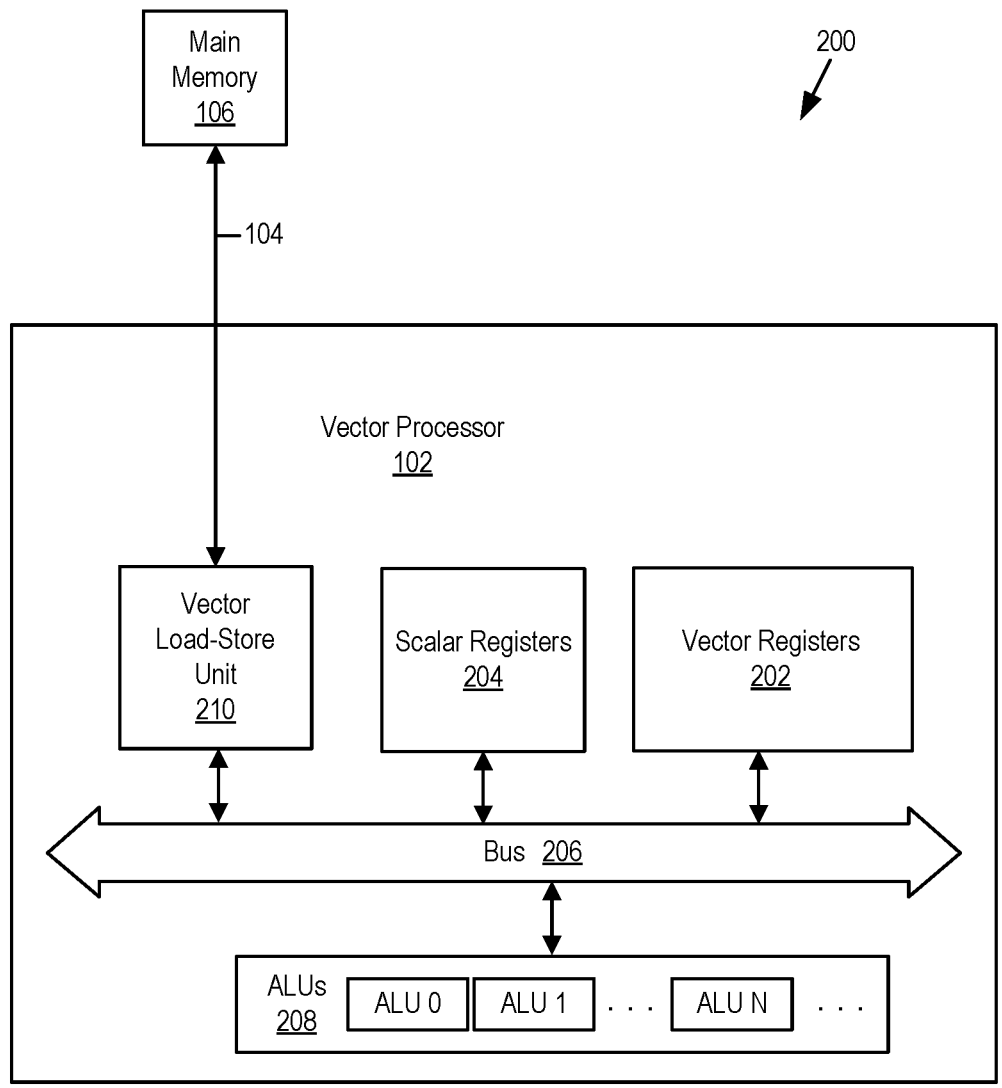
FIG. 2 illustrates example parts of an example computing device 200, in accordance with some embodiments of the present disclosure.

FIG. 2 illustrates example parts of an example computing device 200, in accordance with some embodiments of the present disclosure. As shown, computing device 200 includes vector processor 102 as well as bus 104 and main memory 106 (e.g., see FIG. 1). Computing device 200 can also be or include computing device 100.

As shown in FIG. 2, vector processor 102 includes vector registers 202, scalar registers 204, bus 206, arithmetic logic units 208 (ALUs 208), and vector load-store unit 210. Other embodiments of the computing device 200 can include the scalar registers 204 being external to the vector processor 102 or in a separate unit of the vector processor from a unit in the vector processor having the vector registers 202. The bus 206 communicatively couples vector registers 202, scalar registers 204, arithmetic logic units (ALUs) 208, and vector load-store unit 210, and such components can communicate with each other via bus 206 (which can include multiple buses). Vector registers 202 include multiple vector registers. And, ALUs 208 include multiple ALUs—e.g., arithmetic logic unit (ALU) 0, ALU 1, and ALU N.

Vector processor 102 includes at least one vector index register. Vector processor 102 can be or include one or more central processing units (CPUs) that implement instructions that operate on one-dimensional arrays of data called vectors.

Vector registers 202 in the vector processor 102 can include operand vector registers (i.e., input vector registers), result vector registers (i.e., output vector registers), and vector index registers that store values used for accessing elements in operand vector registers and/or result vector registers. The values in the accessed elements of operand vector registers and/or result vector registers can be used as input for ALUs such as one or more of the ALUs 208.

Figure 5:
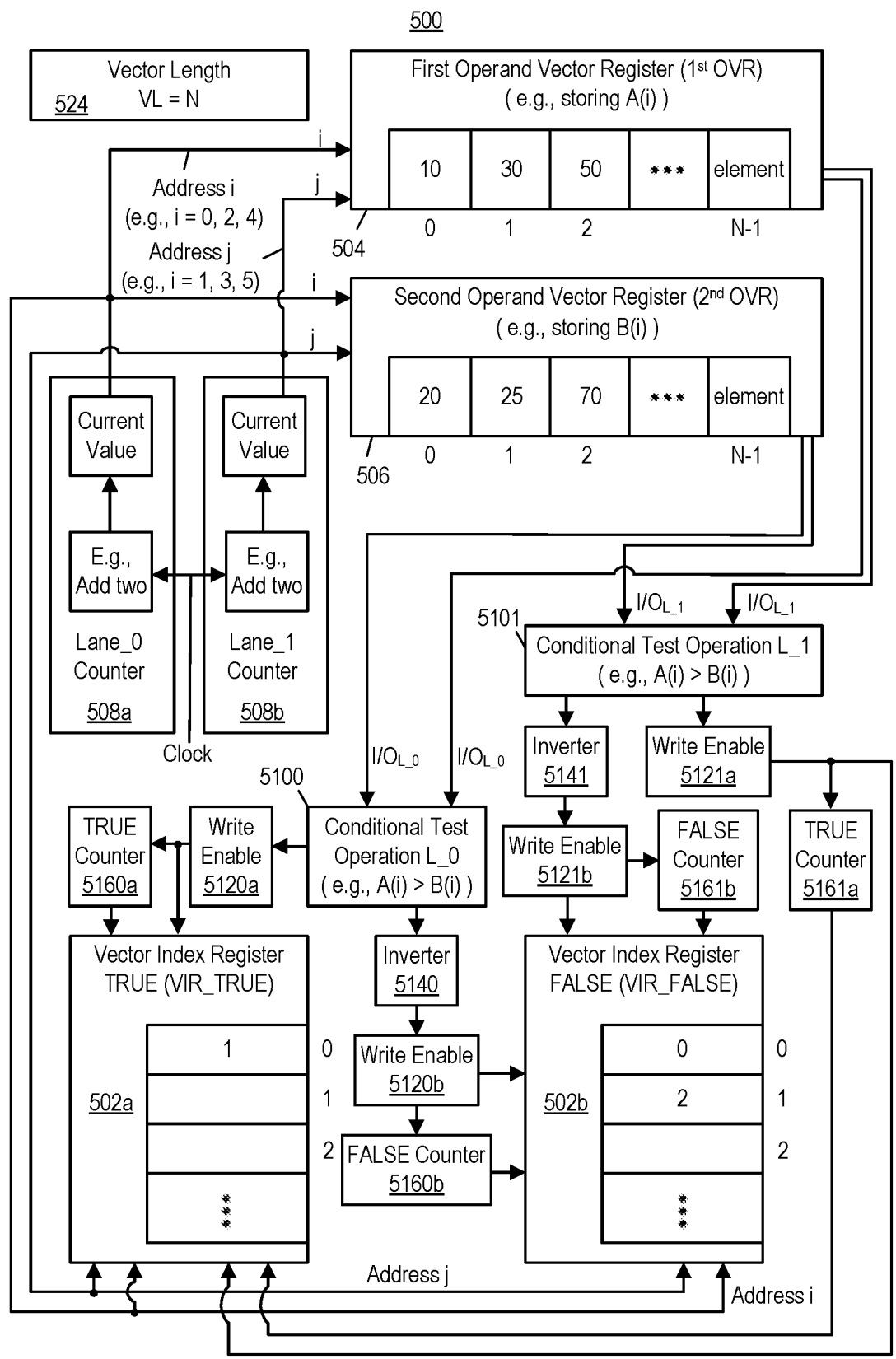
FIG. 5 illustrates an example system using multiple lanes for building indexing vectors for storing in VIR_TRUE and VIR_FALSE, in accordance with some embodiments of the present disclosure.
Figure 8:
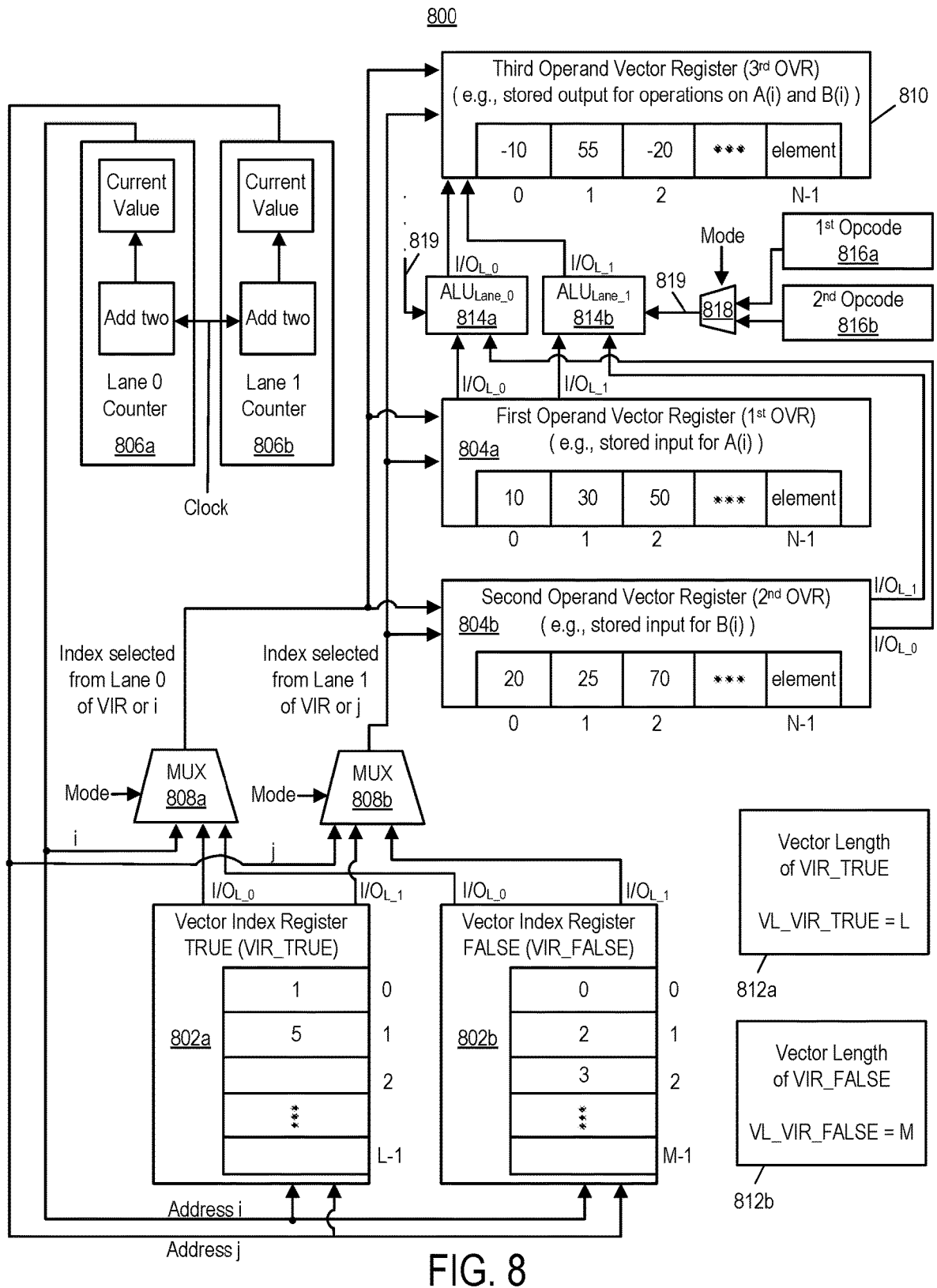
FIG. 8 illustrates an example system including VIR_TRUE and VIR_FALSE being used for executing first and second operations on elements of input operand vectors using multiple lanes, in accordance with some embodiments of the present disclosure.

In general, the vector processor 102 can include index registers that can include scalar index registers and vector index registers such as the vector index registers illustrated in FIGS. 5 and 8.

The scalar registers 204 of the vector processor 102 can include scalar index registers as well as operand scalar registers (i.e., input scalar registers) and result scalar registers (i.e., output scalar registers). At least some of the scalar registers can provide indexing and control values for many different types of operations on scalars and vectors. Also, scalar registers can also provide numerical values used by the vector instructions. For example, a vector provided by a vector register can be multiplied by a scalar provided by a scalar register.

At least some of the scalar registers 204 and the vector registers 202 can be connected to respective ALUs of the ALUs 208. An ALU of ALUs 208 can include a combinational digital electronic circuit that performs arithmetic and bitwise operations on integer binary numbers. In the vector processor 102, an ALU of the ALUs 208 can be connected to input vector registers and in some instances output vector registers if the output vector register is providing feedback in an operation. In such instances the output vector register is both an input and output vector.

Also, the scalar registers 204 can include programmable scalar registers. A programmable scalar register can be used so that a vector provided by a vector register (e.g., one of the vector registers 202) can be operated on by a scalar provided by and programed into one of the programmable scalar registers. For example, one of the operations can include a vector multiplied by a scalar value (e.g., vector A(i)×scalar p).

The bus 206 depicted can be configured to communicatively couple the vector load-store unit 210, the vector registers 202, the scalar registers 204, and the arithmetic logic units 208. The bus 206 can include a 2:1 multiplexor, 3:1 multiplexor, or a N:1 multiplexor configured to receive inputs from vector index registers and to output an address or address component for access of an operand vector. (e.g., see FIG. 8).

Vector load-store unit 210 includes circuitry for executing load and store instructions, generating addresses of load and store vector operations and loading data from memory or storing it back to memory from the registers of the vector processor 102. Vector load-store unit 210 can perform many of the operations described herein including many of the operations of methods 300, 400, and 600 in FIGS. 3, 4, and 6-7.

Each of the computing devices described herein can be a machine capable of executing a set of instructions (sequential or otherwise) that specify actions to be taken by that machine. Further, while a single machine is illustrated for each of the illustrated computing devices of FIGS. 1 and 2, the term "machine" shall also be taken to include any collection of machines that individually or jointly execute a set (or multiple sets) of instructions to perform any one or more of the methodologies or operations discussed herein. And, each of the illustrated computing devices can each include at least a bus and/or motherboard, one or more controllers (such as one or more CPUs), a main memory that can include temporary data storage, at least one type of network interface, a storage system that can include permanent data storage, and/or any combination thereof.

Before the discussion of the methods 300, 400, and 600 depicted in FIGS. 3, 4, and 6-7 and the systems 500 and 800 depicted in FIGS. 5 and 8, it is important to understand that elements in an operand vector register (OVR) can be addressed using at least an index from a vector index register (VIR) or another type of register such as a counter register. In general, when a counter register is used, the counter adds 1 or another number to itself for each iteration or step in a DO or FOR loop that generates the address for the next iteration or step. In multiple lane processing, when a counter register is used, the counter can add 2 or another number that is a multiple of two to itself for each iteration or step in a DO or FOR loop that generates the address for the next iteration or step. The counter can add 2 in dual lane processing. The number added to the current counter number for each increment of the counter number can depend on the number of lanes used by the vector processor. For example, the number added to the counter number can be equal to the number of lanes used. In systems 500 and 800, 2 is added to the count with each increment of the counter and two lanes are being used in both systems.

In some embodiments, the VIRs do not have to be driven by a counter, but it can be useful to have the VIRs driven by one or more counters. Common counters can both provide the address inputs to the VIRs and can provide a separate address input to a receiving multiplexor that outputs an address component for use in accessing an operand vector in a vector operation.

For example, a VIR can store a vector VMX, where VMX(i), and i=0, 1, . . . , n−1. A simple example of an application of use of the VIR would be a compress operation such as B(i)=A(VMX(i)), where, for example, elements of A(i) are compared against a scalar, and TRUE results of the comparison are outputted to B(i). Also, when another vector register stores a vector A, its elements are A(i), where i=0, 1, 2, . . . n. In a regular mode (such as when the counter output is selected for use by a multiplexor), the processor can do A+a, where "a" is a scaler from the counter via the multiplexor. The result is stored in an output vector register B, where B(i)=A(i)+a, and where i=0, 1, . . . , n−1. In the mode using the VIR (e.g., an alternative selection control of the multiplexor), the processor can do A(VMX)+a by using the addresses generated from the output of the VIR. Thus, the output vector register has B, where B(i)=A(VMX(i))+a, and where i=0, 1, . . . , n−1. Also, for example, the vector processor can be configured to operate on two vectors, e.g., B(i)=function (A(VMX(i)), C(VMX(i)), where the "function" is implemented via an ALU.

FIGS. 3 and 4 each illustrates example multiple lane operations for two lanes for building indexing vectors for storing in vector indexing registers for TRUE and FALSE results (e.g., "0" and "1" results) of a conditional test operation (VIR_TRUE and VIR_FALSE), in accordance with some embodiments of the present disclosure. One example difference between the methods in FIGS. 3 and 4 is that the method 300 in FIG. 3 includes performing a conditional test operation with at least one operand scalar and at least one operand vector and the method 400 in FIG. 4 includes performing a conditional test operation with at least two operand vectors.

The method 300 begins at step 302 with loading, by a vector load-store unit of a vector processor (e.g., see vector load-store unit 210), at least one operand vector and at least one operand scalar. In some embodiments, each operand vector is stored in a respective dual-access operand vector register (e.g. see operand vector register 504 or 506 depicted in FIG. 5). Also, each scalar can be stored in a respective operand scalar register (e.g., see scalar registers 204). And, in some embodiments, even positions in a vector are in a first lane and odd positions are in a second lane, or vice versa.

At step 304a, the method 300 continues with performing, by the vector processor, a conditional test operation on the scalar(s) with an element at a first lane (lane 0) index position of the at least one operand vector (e.g., position "0", "2", etc.) according to a first lane count (lane 0 count). The first lane count can be stored in a first lane counter of the vector processor (e.g., see lane 0 counter 508a depicted in FIG. 5). Also, at step 304b, the method 300 continues with performing, by the vector processor, a conditional test operation on the scalar(s) with an element at a second lane (lane 1) index position of the at least one operand vector (e.g., position "1", "3", etc.) according to a second lane count (lane 1 count). The second lane count can be stored in a second lane counter of the vector processor (e.g., see lane 1 counter 508b depicted in FIG. 5).

In FIG. 3, the conditional test operation is performed on at least one scalar from a scalar register and elements of at least one of the loaded one or more operand vectors according to first and second lane counts stored in respective counters. The counters can be scalar registers and a part of the vector processor. No circuit is depicted in the drawings showing an operand scalar register and an operand vector register; however, it is to be understood that the system 500 depicted in FIG. 5 includes components that can support the method 300—except one of the operand vector registers (e.g., register 504 or 506) would be replaced with an operand scalar register.

At step 306a, the method 300 continues with identifying, by the vector processor, whether the result of the conditional test operation in step 304a is a TRUE result. To put it another way, at step 306a, the method 300 continues with identifying whether the result of the conditional test operation of step 304a is TRUE or FALSE (e.g., Boolean "1" or "0"). If the result of the operation at step 304a is TRUE, then the method 300 continues at step 308a with storing, in a first lane index position in a vector index register for TRUE results of the conditional test operation (VIR_TRUE), the position of the element(s) of the loaded operand vector(s) according to the first lane count (such as according to the first lane count via a first lane TRUE count stored in a first lane TRUE counter—e.g., see first lane TRUE counter 5160a depicted in FIG. 5). If the result of the test operation of step 304a is FALSE, then the method 300 continues at step 310a with storing, in a first lane index position in a vector index register for FALSE results of the comparison (VIR_FALSE), the position of the element(s) of the loaded operand vector(s) according to the first lane count (such as according to the first lane count via a first lane FALSE count stored in a first lane FALSE counter—e.g., see first lane FALSE counter 5160b depicted in FIG. 5).

At step 306b, the method 300 continues with identifying, by the vector processor, whether the result of the conditional test operation in step 304b is a TRUE result. To put it another way, at step 306b, the method 300 continues with identifying whether the result of the conditional test operation of step 304b is TRUE or FALSE (e.g., Boolean "1" or "0"). If the result of the operation at step 304b is TRUE, then the method 300 continues at step 308b with storing, in a second lane index position in the VIR_TRUE, the position of the element(s) of the loaded operand vector(s) according to the second lane count (such as according to the second lane count via a second lane TRUE count stored in a second lane TRUE counter—e.g., see first lane TRUE counter 5161a depicted in FIG. 5). If the result of the test operation of step 304b is FALSE, then the method 300 continues at step 310b with storing, in a second lane index position in the VIR_FALSE, the position of the element(s) of the loaded operand vector(s) according to the second lane count (such as according to the second lane count via a second lane FALSE count stored in a second lane FALSE counter—e.g., see second lane FALSE counter 5161b depicted in FIG. 5).

At step 312, the first lane count and the second lane count are each incremented by two. The method 300 repeats steps 304a, 304b, 306a, 306b, 308a, 308b, 310a, 310b, and 312 until either of the first count or the second count equals or exceeds the vector length (VL) of at least one of the operand vector(s). By incrementing the counts until one of the counts equals or exceeds the VL, the vector processor can continue with storing positions of elements of the loaded operand vector(s) according to the counts until the positions of the elements of the loaded operand vector(s) are stored in the VIR_TRUE or the VIR_FALSE. In other words, the method 300 continues the storing of positions of elements of the loaded operand vector(s) according to the counts until the positions of the elements of the loaded operand vector(s) are stored in the VIR_TRUE or the VIR_FALSE.

At step 314, the method 300 continues with identifying whether the first lane count or the second lane count equals or exceeds the VL of at least one of the operand vector(s). In some embodiments, the method 300 can continue with identifying whether the VL of one of the OVR(s), accessed by the conditional test operation, equals the result of adding the VL of the VIR_TRUE and the VL of the VIR_FALSE, which can be another way to identify whether one of the counts equals or exceeds the VL of the operand vector(s) stored in the OVR(s). These example alternative ways of identifying whether the count equals the VL of at least one of the operand vector(s) can show that all the elements of an OVR accessed by the test operation are used in the conditional test operation.

If the first count and the second count are both less than the VL of one of the operand vector(s), then the method continues at steps 304a and 304b. Otherwise, the method 300 has completed the building of indexing vectors for storing in VIR_TRUE and VIR_FALSE.

Upon completion of the building of indexing vectors which are stored in VIR_TRUE and VIR_FALSE, the method 300 continues, at step 316, with loading from VIR_TRUE and/or VIR_FALSE, by the vector load-store unit, stored first lane and second lane positions of elements of one or more loaded operand vectors. And, at step 318, the method 300 continues with iterating one or more vector operations over the elements of the loaded operand vector(s) according to the loaded positions stored in the VIR_TRUE and/or VIR_FALSE. In some embodiments, the number of iterations for step 318 is equal to the VL (as shown in step 312). In such embodiments, two respective registers can be loaded with the new vector lengths for VIR_TRUE and VIR_FALSE (e.g., VL_VIR_TRUE and VL_VIR_FALSE). In other words, one VL register for the number of entries stored in VIR_TRUE and one register for the number of entries stored in VIR_FALSE. In such embodiments, respective VL registers can be loaded with vector lengths of the OVRs as well. Thus, in such embodiments, at step 318, when the method 300 continues with iterating one or more vector operations over the elements of the loaded operand vector(s) according to the loaded positions stored in the VIR_TRUE and/or VIR_FALSE, the vector processor can determine the number of iterations on the OVR(s) and/or the VIRs according to their respective VL values in respective VL registers.

Methods 300 and 400 in FIGS. 3 and 4 are somewhat similar except for some minor differences. As mentioned herein, one example difference between the methods in FIGS. 3 and 4 is that the method 300 in FIG. 3 includes performing a conditional test operation with at least one operand scalar and at least one operand vector and the method 400 in FIG. 4 includes performing a conditional test operation with at least two operand vectors.

In FIG. 4, the method 400 begins at step 402 with loading, by a vector load-store unit of vector processor, at least two operand vectors. In some embodiments, each operand vector is stored in a respective dual-access operand vector register (e.g. see operand vector register 504 or 506 depicted in FIG. 5). And, in some embodiments, even positions in a vector are in a first lane and odd positions are in a second lane, or vice versa.

At step 404a, the method 400 continues with performing, by the vector processor, a conditional test operation with respective elements at similar first lane (lane 0) index positions of the at least two operand vectors (e.g., position "0", "2", etc.) according to a first lane count. The first lane count can be stored in a first lane counter of the vector processor (e.g., see lane 0 counter 508a depicted in FIG. 5). Also, at step 404b, the method 400 continues with performing, by the vector processor, a conditional test operation with respective elements at similar second lane (lane 1) index positions of the at least two operand vectors (e.g., position "0", "2", etc.) according to a second lane count. The second lane count can be stored in a second lane counter of the vector processor (e.g., see lane 1 counter 508b depicted in FIG. 5).

At step 406a, the method 400 continues with identifying, by the vector processor, whether the result of the conditional test operation in step 404a is a TRUE result. If the result of the operation at step 404a is TRUE, then the method 400 continues at step 408a with storing, in a first lane index position in VIR_TRUE, the position of the elements of the loaded operand vectors according to the first lane count (such as according to the first lane count via a first lane TRUE count stored in a first lane TRUE counter—e.g., see first lane TRUE counter 5160a depicted in FIG. 5). If the result of the test operation of step 404a is FALSE, then the method 400 continues at step 410a with storing, in a first lane index position in VIR_FALSE, the position of the elements of the loaded operand vectors according to the first lane count (such as according to the first lane count via a first lane FALSE count stored in a first lane FALSE counter—e.g., see first lane FALSE counter 5160b depicted in FIG. 5).

At step 406b, the method 400 continues with identifying, by the vector processor, whether the result of the conditional test operation in step 404b is a TRUE result. If the result of the operation at step 404b is TRUE, then the method 400 continues at step 408b with storing, in a second lane index position in VIR_TRUE, the position of the elements of the loaded operand vectors according to the second lane count (such as according to the second lane count via a second lane TRUE count stored in a second lane TRUE counter—e.g., see second lane TRUE counter 5161a depicted in FIG. 5). If the result of the test operation of step 404b is FALSE, then the method 400 continues at step 410b with storing, in a second lane index position in VIR_FALSE, the position of the elements of the loaded operand vectors according to the second lane count (such as according to the second lane count via a second lane FALSE count stored in a second lane FALSE counter—e.g., see second lane FALSE counter 5161b depicted in FIG. 5).

At step 412, the first lane count and the second lane count are each incremented by two. The method 400 repeats steps 404a, 404b, 406a, 406b, 408a, 408b, 410a, 410b, and 412 until either of the first count or the second count equals or exceeds the vector length (VL) of at least one of the operand vectors. By incrementing the counts until one of the counts equals or exceeds the VL, the vector processor can continue with storing positions of elements of the loaded operand vectors according to the counts until the positions of the elements of the loaded operand vectors are stored in the VIR_TRUE or the VIR_FALSE. At step 414, the method 400 continues with identifying whether the first lane count or the second lane count equals or exceeds the VL of at least one of the operand vectors. In some embodiments, the method 400 can continue with identifying whether the VL of one of the OVRs, accessed by the conditional test operation, equals the result of adding the VL of the VIR_TRUE and the VL of the VIR_FALSE. If the first count and the second count are both less than the VL of one of the operand vectors, then the method continues at steps 404a and 404b. Otherwise, the method 400 has completed the building of indexing vectors for storing in VIR_TRUE and VIR_FALSE.

Upon completion of the building of indexing vectors which are stored in VIR_TRUE and VIR_FALSE, the method 400 continues, at step 416, with loading from VIR_TRUE and/or VIR_FALSE, by the vector load-store unit, stored first lane and second lane positions of elements of one or more loaded operand vectors. And, at step 418, the method 400 continues with iterating one or more vector operations over the elements of the loaded operand vector(s) according to the loaded positions stored in the VIR_TRUE and/or VIR_FALSE.

FIG. 5 illustrates an example system 500 for building indexing vectors for storing in VIR_TRUE 502a and VIR_FALSE 502b, in accordance with some embodiments of the present disclosure. The system 500 can implement many of the operations and aspects of methods 300 and 400 and the system 500 can be a part of one or more vector processors. The system 500 includes the VIR_TRUE 502a and VIR_

FALSE 502b. The system also includes a first OVR 504 and a second OVR 506, such as OVRs mentioned in the description of method 400.

The system 500 also includes a first lane counter 508a, which can be partially implemented by a counter register and can be the first lane counter described in the description of the method 400. The system 500 also includes a second lane counter 508b, which can be partially implemented by a counter register and can be the second lane counter described in the description of the method 400.

The system 500 also includes a first lane conditional test operation 5100 that can perform a conditional test operation, such as a comparison of the values stored in the first lane of first and second OVRs 504 and 506. The system 500 also includes a second lane conditional test operation 5101 that can perform a conditional test operation, such as a comparison of the values stored in the second lane of the first and second OVRs 504 and 506.

The conditional test operations 5100 and 5101 can be the same test operation or different test operations and can perform many different types of conditional test operations such as many different types of comparisons of the OVRs 504 and 506 or one or more of the OVRs compared to a scalar, e.g., $1^{st}$ OVR (i)<$2^{nd}$ OVR (i), $1^{st}$ OVR (i)=$2^{nd}$ OVR (i), $1^{st}$ OVR (i)>$2^{nd}$ OVR (i), $1^{st}$ OVR (i)≤$2^{nd}$ OVR (i), $1^{st}$ OVR (i)≥$2^{nd}$ OVR (i), $1^{st}$ OVR (i)<a scalar value, $1^{st}$ OVR (i)=a scalar value, $1^{st}$ OVR (i)>a scalar value, $1^{st}$ OVR (i)≤a scalar value, or $1^{st}$ OVR (i)≥a scalar value, etc.

The first lane conditional test operation 5100 can execute against elements of two vectors having a similar address (e.g., a similar index or iteration i), in a first lane, one test or comparison at a time or per cycle. At each iteration i (which also represents address or address component i), the first lane counter 508a provides address i for accessing the OVRs 504 and 506 for the first lane conditional test operation 5100. In the system 500, the index "i" for the first lane is incremented by two. For example, by incrementing by two, the index "i" can start at an initial position the OVRs and increment to every other position afterwards, such that the first lane includes the even numbered positions of the OVRs 504 and 506 (e.g., i=0, 2, 4, etc.). In some examples, the elements/outputs of OVRs 504 and 506 at iteration or address i are compared to each other or with a value from another register such as a scalar register (e.g., see method 300). The first lane conditional test operation 5100 generates a single output, which is either TRUE or FALSE (e.g., "1" or "0").

The second lane conditional test operation 5101 can execute against elements of two vectors having a similar address (e.g., a similar index or iteration j), in a second lane, one test or comparison at a time or per cycle. At each iteration j (which also represents address or address component j), the second lane counter 508b provides address j for accessing the OVRs 504 and 506 for the second lane conditional test operation 5101. In the system 500, the index "j" for the second lane is incremented by two. For example, by incrementing by two, the index "j" can start at a second position the OVRs and increment to every other position afterwards, such that the second lane includes the odd numbered positions of the OVRs 504 and 506 (e.g., j=1, 3, 5, etc.). In some examples, the elements/outputs of OVRs 504 and 506 at iteration or address j are compared to each other or with a value from another register such as a scalar register (e.g., see method 300). The second lane conditional test operation 5101 generates a single output, which is either TRUE or FALSE (e.g., "1" or "0").

The conditional test operations 5100 and 5101 can be configured to perform the test operations at steps 304a and 304b respectively or can be configured to perform the test operations at steps 404a and 404b respectively. In other words, the first and second lane conditional test operations 5100 and 5101 can be configured to execute on elements of the loaded operand vectors according to respective counts stored in respective counter registers such as counters 508a and 508b. The conditional test operations 5100 and 5101 can also be configured to perform the identification of a TRUE or FALSE result at steps 306a or step 306b respectively or at steps 406a or step 406b respectively. In other words, the conditional test operations 5100 and 5101 can be configured to identify whether the result of the conditional test operations are TRUE or FALSE. The conditional test operations 5100 and 5101 can be configured to output a TRUE or FALSE result, such as a "1" for a TRUE result or a "0" for a FALSE result. The output of each of the conditional test operations 5100 and 5101 is inputted into a respective write enable for each of the VIR_TRUE 502a and the VIR_FALSE 502b (e.g., see write enables 5120a, 5120b, 5121a, and 5121b). To put it another way, the system 500 includes write enable 5120a for first lane positions of VIR_TRUE 502a, write enable 5120b for first lane positions of VIR_FALSE 502b, write enable 5121a for second lane positions of VIR_TRUE 502a, and write enable 5121b for second lane positions of VIR_FALSE 502b.

The output from the first lane conditional test operation 5100 can be communicated directly to the write enable 5120a for the VIR_TRUE 502a. The output from the first lane conditional test operation 5100 can be communicated indirectly to the write enable 5120b for the VIR_FALSE 502b, via an inverter 5140. The inverter 5140 is configured to invert the output of first lane conditional test operation 5100 before it reaches the write enable 5120b for the VIR_FALSE 502b. For example, if the output of the first lane conditional test operation 5100 is TRUE (e.g., "1"), then when it is inputted into the inverter 5140 the inverter inverts the value to FALSE (e.g., "0") and outputs FALSE. Likewise, the output from the second lane conditional test operation 5101 can be communicated directly to the write enable 5121a for the VIR_TRUE 502a. The output from the second lane conditional test operation 5101 can be communicated indirectly to the write enable 5121b for the VIR_FALSE 502b, via an inverter 5141. The inverter 5141 is configured to invert the output of second lane conditional test operation 5101 before it reaches the write enable 5121b for the VIR_FALSE 502b.

The system 500 also includes separate TRUE counters 5160a and 5160b for the first and second lanes of the VIR_TRUE 502a and separate FALSE counters 5161a and 5161b for the VIR_FALSE 502b. The outputs of the conditional test operations 5100 and 5101 drive the four counters, counters 5160a, 5160b, 5161a and 5161b. The counters 5160a, 5160b, 5161a and 5161b are separate from the first and second lane counters 508a and 508b that provide the addresses i and j for the OVRs 504 and 506. Outputs of TRUE counters 5160a and 5161a are used as the first and second lane addresses for accessing VIR_TRUE 502a. Outputs of FALSE counters 5160b and 5161b are used as the first and second lane addresses for accessing VIR_FALSE 502b. For example, when the output of the first lane conditional test operation 5100 is TRUE, the output triggers write enable 5120a to write the current first lane position of the OVRs 504 and 506 into the VIR_TRUE 502a. Also, for example, when the output of the first lane conditional test operation 5100 is FALSE, the output triggers write enable 5120*b* to write the current first lane position from the OVRs 504 and 506 into the VIR_FALSE 502*b*. This functionality is provided via the circuit including the inverter 5140 and the two write enables 5120*a* and 5120*b*. Also, somewhat similar functionality can be provided for the second lane positions of the OVRs 504 and 506 via the circuit including the inverter 5141 and the two write enables 5121*a* and 5121*b*.

The outputs of counters 2508*a* and 2508*b* are also used as the addresses or address components (or indexes) to be written into VIR_TRUE 502*a* at addresses specified by the first lane TRUE counter 5160*a* and the second lane TRUE counter 5161*a*. This occurs when the output of the test operations 5100 and 5101 are TRUE. In system 500, the respective values stored in TRUE counters 5160*a* and 5161*a* are increased by two for each triggering TRUE output from the test operations 5100 and 5101 respectively. Likewise, the output of 508*a* and 508*b* are also used as the addresses or address components to be written into VIR_FALSE 502*b* at addresses specified by the first lane FALSE counter 5160*b* and the second lane FALSE counter 5161*b*. This occurs when the output of the test operations 5100 and 5101 are FALSE. In system 500, the respective values stored in FALSE counters 5160*b* and 5161*b* are increased by two for each triggering FALSE output from the test operations 5100 and 5101 respectively. This overall functionality of selecting where to store the addresses of the OVR components is provided by the circuitry including the test operations 5100 and 5101, the write enables 5120*a*, 5120*b*, 5121*a*, and 5121*b*, the inverters 5140 and 5141, the TRUE counters 5160*a* and 5161*a*, and the FALSE counters 5160*b* and 5161*b*.

The VIR_TRUE 502*a* and the VIR_FALSE 502*b* each are an output register of the system 500. The system 500 can be a part of a vector processor that includes a vector load-store unit, such as the vector processor in FIG. 2.

The system 500 is also shown to include a scalar register for vector length, vector length register 524 (VLR 524). VLR 524 is configured to store the vector length (VL) of the OVRs 504 and 506. A vector processor can load the VL into memory from VLR 524 to identify whether the count from one of counters 508*a* and 508*b* equals the VL of the respective operand vectors stored in the OVRs 504 and 506. In other words, one value is in a register for the VL of the operand vectors in OVRs 504 and 506. This is one way for example to implement step 314 of method 300 or 414 of method 400. If one of the counts is less than the VL, then the counts in the counters continue to increment per clock cycle or another trigger or iteration (e.g., see steps 312 or 412). By incrementing the counts until one of the counts equals the VL, the vector processor can continue with storing positions of elements of the OVRs 504 and 506 until the positions of the elements of the OVRs are stored in the VIR_TRUE 502*a* or the VIR_FALSE 502*b*. If one of the counts is equal to or exceeds the VL, then the vector processor using system 500 has completed the building of indexing vectors for storing in VIR_TRUE 502*a* and VIR_FALSE 502*b*. When new indexing vectors are to be built, the count is reset in the counters 508*a* and 508*b* (as well as the TRUE and FALSE counters) and VL is determined and stored in VLR 524. The vector processor can initially determine the vector length of an OVR (e.g., the lengths of the OVRs 504 and 506) and then store the lengths (which is one length) in the VLR 524 before performing method 300 or 400.

Figure 6:
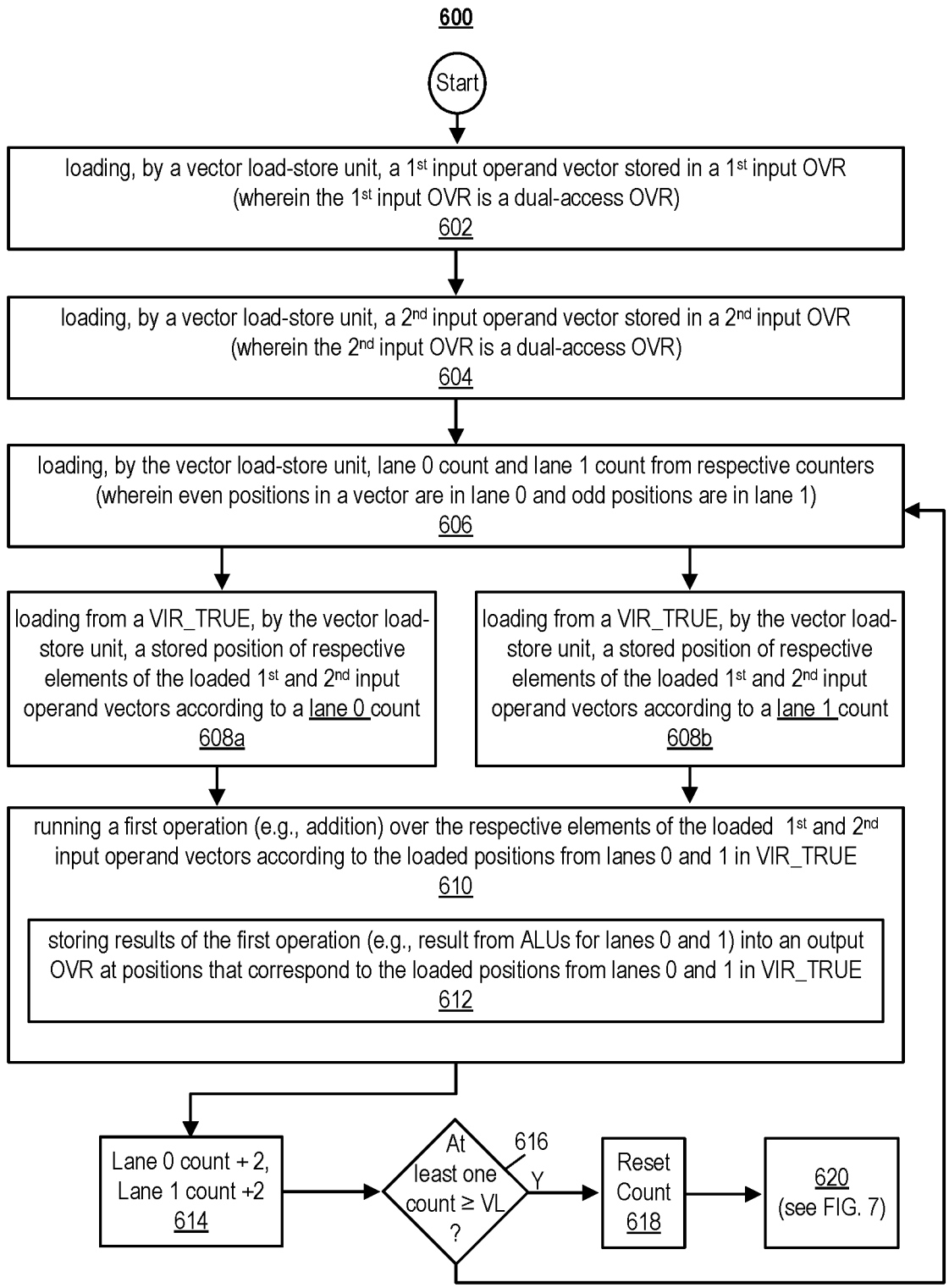
FIGS. 6 and 7 illustrate example operations of method 600 for executing operations on elements of operand vectors using multiple lanes and according to a VIR_TRUE and a VIR_FALSE, in accordance with some embodiments of the present disclosure.
Figure 7:
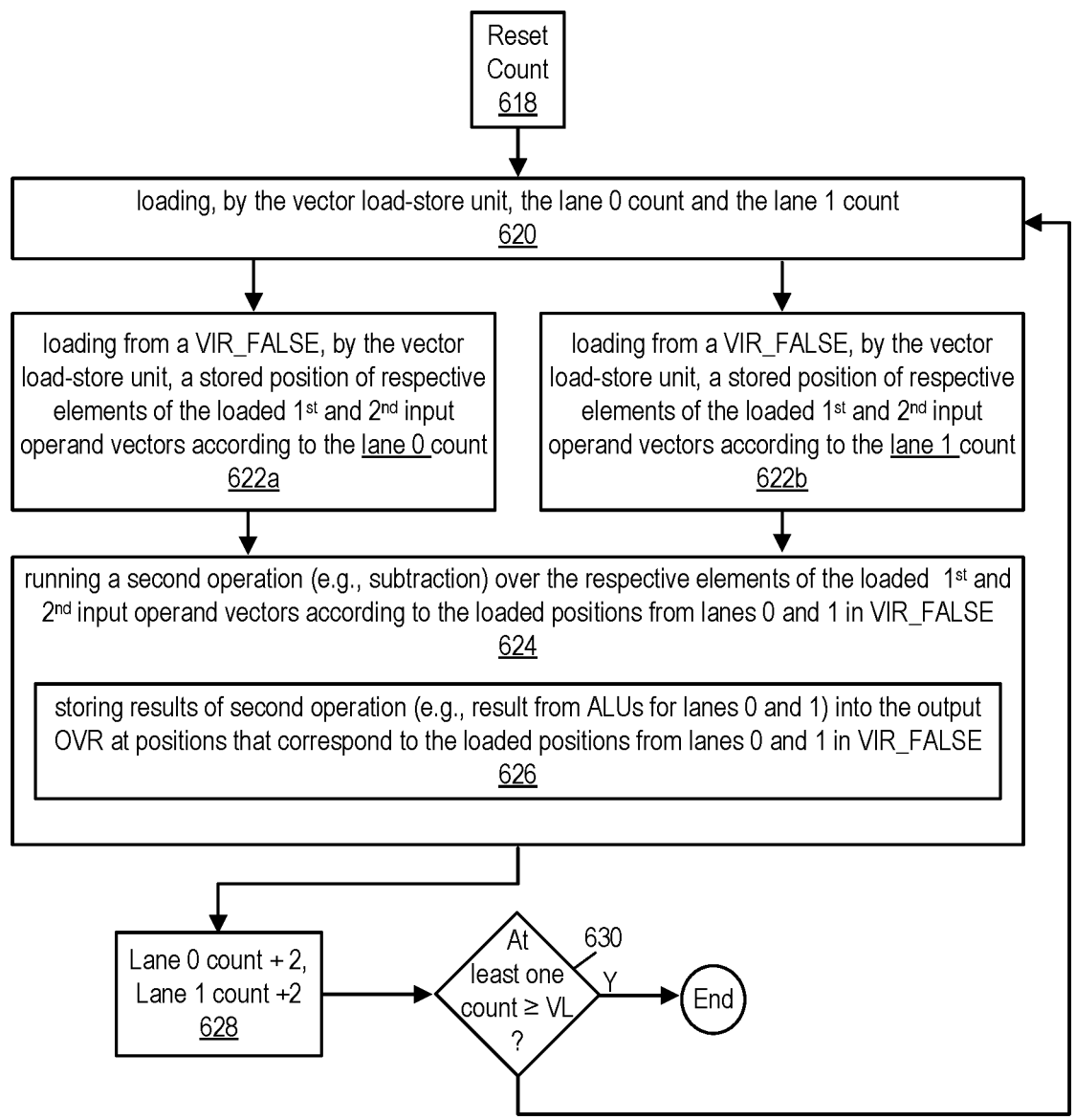

FIGS. 6 and 7 illustrate example operations of method 600 for executing operations on elements of operand vectors using multiple lanes and according to a VIR_TRUE and a VIR_FALSE (e.g., see VIR_TRUE 802*a* and VIR_FALSE 802*b* depicted in FIG. 8), in accordance with some embodiments of the present disclosure.

Also, the example operations of method 600 for executing operations on elements of operand vectors can be according to a VIR_TRUE and a VIR_FALSE that are accessed in parallel in that, for example, both occurrences of position i in VIR_TRUE and VIR_FALSE are accessed in the same clock cycle or iteration (not depicted), in accordance with some embodiments of the present disclosure. In such examples, vector lengths of VIR_TRUE and VIR_FALSE, VL_VIR_TRUE and VL_VIR_FALSE, are not compared to the count and the count is not reset during the executing of the operations on the operand vectors. Also, in such examples and others, step 616 can occur per clock cycle or iteration of the operations. And, in such examples, where the VIRs are accessed in parallel, steps 606-612 and steps 620-626 can be performed in parallel as well.

In FIG. 6, the method 600 begins at step 602, with loading, by a vector load-store unit, a first input operand vector stored in a first input OVR (e.g., see first OVR 804*a*). The first input OVR can be a dual-access OVR. At step 604, the method 2100 continues with loading, by a vector load-store unit, a second input operand vector stored in a second input OVR (e.g., see second OVR 804*b*). The second input OVR can be a dual-access OVR. At step 606, the method 600 continues with loading, by the vector load-store unit, a first lane count and a second lane count from respective counters (e.g., see first and second lane counters 808*a* and 808*b*). In some embodiments, even numbered positions in a vector are in the first lane and odd numbered positions are in the second lane.

At step 608*a*, the method 600 continues with loading from a VIR_TRUE, by the vector load-store unit, a stored position of respective elements of the loaded first and second input operand vectors according to the first lane count. At step 608*b*, the method 600 continues with loading from the VIR_TRUE, by the vector load-store unit, a stored position of respective elements of the loaded first and second input operand vectors according to the second lane count. As shown in FIG. 6, steps 608*a* and 608*b* can performed in parallel or simultaneously.

At step 610, the method 600 continues with executing a first operation (e.g., addition) over the respective elements of the loaded first and second input operand vectors according to the loaded positions from the first and second lanes in the VIR_TRUE. Step 610 includes step 612 that includes the method 600 continuing with storing the result of the first operation (e.g., result from ALUs for first and second lanes—see first lane ALU 814*a* and second lane ALU 814*b*) into an output OVR (e.g., see output OVR 810) at positions that correspond to the loaded positions from the first and second lanes in VIR_TRUE.

At step 614, the method 600 continues with incrementing each of the first and second lane counts by two. At step 616, the method 600 continues with comparing the first and second lane counts to a value representing the vector length of the VIR_TRUE, i.e., VL_VIR_TRUE, such that the first operation can be iterated over the loaded first and second input operand vectors stored in the input operand vector registers for each of the positions stored in the VIR_TRUE. When one of the counts equals or exceeds the vector length of the VIR_TRUE, then the method 600 continues with resetting the first and second lane counts in the respective count registers, at step 618.

It is to be understood that the VL_VIR_TRUE and the VL_VIR_FALSE are preloaded with the vector lengths of VIR_TRUE and VIR_FALSE before the method 600 is initiated. In some embodiments, the VL_VIR_TRUE and the VL_VIR_FALSE are loaded with the lengths of the vectors in VIR_TRUE and the VIR_FALSE while VIR_TRUE and VIR_FALSE are loaded with vector index elements.

When the count is less than the vector length, at step 616, the method 600 continues with returning to step 606 (loading the first and second lane counts) which is followed by steps 608a and 608b (loading stored positions from the VIR_TRUE) and step 610 (running the first operation over the elements of the loaded input operand vectors). This way the first operation is iterated over the input OVRs for each of the first and second lane positions stored in the VIR_TRUE.

Subsequently, at step 620, the method 600 continues with loading, by the vector load-store unit, the first and second lane counts stored in the respective counter registers. In examples using VIR_TRUE and VIR_FALSE, the value of the first lane count at the first iteration of step 620 can be "0" and the value of the second lane count at the first iteration of step 620 can be "1". As shown, in step 628, the counts are incremented by two, so in such examples the next value of the first lane count can be "2", and the next value of the second lane count can be "3".

At step 622a, the method 600 continues with loading from a VIR_FALSE, by the vector load-store unit, a stored position of respective elements of the loaded first and second input operand vectors according to the first lane count. At step 622b, the method 600 continues with loading from a VIR_FALSE, by the vector load-store unit, a stored position of respective elements of the loaded first and second input operand vectors according to the second lane count.

At step 624, the method 600 continues with executing a second operation (e.g., subtraction) over the respective elements of the loaded first and second input operand vectors according to the loaded positions from first and second lanes in VIR_FALSE. Step 624 includes step 626 that includes the method 600 continuing with storing results of the second operation (e.g., results from respective ALUs for first and second lanes) into the output OVR at positions that correspond to the loaded positions from first and second lanes in VIR_FALSE.

At step 628, the method 600 continues with incrementing each of the first and second lanes counts by two. At step 630, the method 600 continues with comparing the counts to a value representing the vector length of the VIR_FALSE, i.e., VL_VIR_FALSE, such that the first operation can be iterated over the loaded first and second input operand vectors stored in the input operand vector registers for each of the positions stored in the VIR_FALSE. When at least one of the counts equals or exceeds the vector length of the VIR_FALSE, then the method 600 ends. When both of the first and second lane counts are less than the vector length, at step 630, the method 600 continues with returning to step 620 (loading the counts) which is followed by steps 622a and 622b (loading positions from the VIR_FALSE) and step 624 (running the second operation over the elements of the loaded input operand vectors). This way the second operation is iterated over the input OVRs for each of the first and second lane positions stored in the VIR_FALSE.

In the methods described herein the first operation can include addition, subtraction, multiplication, division, or any other type of operation that can be performed by one or more ALUs. And, the second operation can include a different operation from the first operation that can be performed by one or more ALUs.

FIG. 8 illustrates an example system 800 including VIR_TRUE 802a and VIR_FALSE 802b being used for executing, in multiple lanes, first and second operations on elements of input operand vectors stored in input operand vector registers 804a and 804b, in accordance with some embodiments of the present disclosure. Example system 800 is one example of a system that can implement at least method 600.

As shown, VIR_TRUE 802a and VIR_FALSE 802b are dual-access VIRs. Thus, two addresses in each of the VIRs can be accessed in parallel (e.g., in one clock cycle). As shown, an address "i" and an address "j" from a first lane counter and a second lane counter respectively can be inputs into both the dual-access VIRs. Also, the VIR_TRUE 802a and VIR_FALSE 802b each can output a stored first lane element and a stored second lane element in parallel (e.g., in one clock cycle).

The system 800 also includes input OVRs 804a and 804b. The input OVRs are dual-access OVRs in the system 800. The system 800 also includes an output operand register 810 which is also a dual-access OVR. In general, the first and second lane ALUs 814a and 814b can receive first lane and second lane inputs from the input OVRs 804a and 804b and output results of numerical operations performed by the ALUs to the output OVR 810.

The system 800 also includes first lane counter 806a which outputs index "i" and second lane counter which outputs index "j". Index i can be used as the first lane count in method 600. Index j can be used as the second lane count in method 600.

The system 800 also includes first lane multiplexor 808a and second lane multiplexor 808b. Each of the multiplexors 808a and 808b can execute in a regular mode, a TRUE mode, and a FALSE mode. The multiplexors 808a and 808b allow for the switching of TRUE mode to FALSE mode after the resetting of first and second lane counters in method 600. The first lane multiplexor 808a receives input from the first lane counter 806a, the first lane of VIR_TRUE 802a, and the first lane of VIR_FALSE 802b. The multiplexor 808a outputs one of the three inputs depending on its mode. The second lane multiplexor 808b receives input from the second lane counter 806b, the second lane of VIR_TRUE 802a, and the second lane of VIR_FALSE 802b. The multiplexor 808b outputs one of the three inputs depending on its mode.

The system 800 also includes registers for vectors lengths of the VIR_TRUE 802a and the VIR FALSE 802b. The vector lengths can be used at steps 616 and 630 respectively in method 600.

The system 800 also includes ALUs for each lane in dual-lane processing (e.g., first lane ALU 814a and second lane ALU 814b). The ALUs 814a and 814b can perform subtraction, multiplication, division, or any other type of operation that can be performed by one or more ALUs according to the opcodes (e.g., opcodes 816a and 816b) received via the multiplexor 818. As shown, the output of the multiplexor 818 can be received by both of the ALUs 814a and 814b.

In FIG. 8, the VIR_TRUE 802a stores a list of positions of the input OVRs 804a and 804b. For example, "1" is stored in position "0" of VIR_TRUE 802a, which can be used as an address for accessing position "1" in both input OVRs 804a and 804b. In the example system 800, position "0" of the VIR_TRUE as well as positions "2", "4", etc. are in a first lane of the VIR_TRUE. And, the other positions of VIR_TRUE are in a second lane of VIR_TRUE. Also, the VIR_FALSE 802b stores a list of positions of the input OVRs 804a and 804b. For example, "0" and "2" are stored in positions "0" and "1" of VIR_FALSE 802*b* respectively, which can be used as addresses for accessing positions "0" and "2" in both input OVRs 804*a* and 804*b*. In the example system 800, position "0" of the VIR_FALSE as well as positions "2", "4", etc. are in a first lane of the VIR_FALSE. And, the other positions of VIR_FALSE are in a second lane of VIR_FALSE.

In this illustrated example of FIG. 8, it is shown that the vector processor executes for at least two iterations of a subtraction operation and for at least one iteration of an addition operation. At the first iteration of the at least two cycles of the subtraction operation, counter 806*a* outputs the count of "0" which is the value stored in the counter at the first cycle during a subtraction mode. In the first cycle of the subtraction mode, VIR_FALSE 802*b* is shown outputting selected address "0" from position "0" of the VIR_FALSE. At the first iteration of the at least one cycle of the addition operation, counter 806*a* outputs the count of "0" as well, which is the value stored in the counter at the first cycle during an addition mode. In the first cycle of the addition mode, VIR_TRUE 802*a* is shown outputting selected address "1" from position "0" of the VIR_TRUE. Being that position "0" in both of the VIRs is a first lane position and the OVRs are dual access OVRs, the subtraction and addition can occur within a first lane within a first clock cycle in parallel.

The first lane multiplexor 808*a* selects between the address component ("0") as specified by the counter 806*a* in a NORMAL mode operation or the address component ("1") as stored in position "0" of the VIR_TRUE 802*a* in a TRUE mode of operation or the address component ("0") as stored in position "0" of the VIR_FALSE 802*b* in a FALSE mode of operation. As mentioned, position "0" is a first lane position in the example; thus, the first lane multiplexor 808*a* is used. In the second lane processing, when the initial count in second lane counter 806*b* is "1", then second lane multiplexor 808*b* selects between the address component ("1") as specified by the counter in the NORMAL mode operation or the address component ("5") as stored in position "1" of the VIR_TRUE 802*a* in the TRUE mode of operation or the address component ("2") as stored in position "1" of the VIR_FALSE 802*b* in the FALSE mode of operation; and, so on. As mentioned, position "1" is a second lane position in the example; thus, the second lane multiplexor 808*b* is used. In other words, the first and second lane multiplexors 808*a* and 808*b* select between the outputs of counters 806*a* and 808*b* respectively, first and second lanes in VIR_TRUE 802*a* respectively, and first and second lanes in VIR_FALSE 802*b* respectively. And, the outputs provided by the first lane in VIR_TRUE 802*a* and VIR_FALSE 802*b* are according to the count of the first lane counter 806*a*. The outputs provided by the second lane in VIR_TRUE 802*a* and VIR_FALSE 802*b* are according to the count of the second lane counter 806*b*.

In method 600, the multiplexors 808*a* and 808*b* can implement a switching from the TRUE mode to the FALSE mode upon the reset of the counters at step 618. The counters 806*a* and 806*b* are reset when one of the counts equals or exceeds the vector length of either the VIR_TRUE or the VIR_FALSE (e.g., see VL_VIR_TRUE 812*a* and VL_VIR_FALSE 812*b*). This switching allows for the loop of steps 606-616 to switch to the loop of steps 620-630.

It is to be understood that selections described herein can be according to programmer visible instructions and/or can be a hardwired circuit that is doing some a high level semantic operation.

When the TRUE mode is selected by the multiplexor 808*a*, in the first lane in the first cycle, the output of "1" from the VIR_TRUE 802*a* is the address component used for accessing the input OVRs 804*a* and 804*b*. As a result, the input OVRs 804*a* and 804*b* are accessed for respective outputs of element "30" at position "1" of the input OVR 804*a* and element "25" at position "1" of input OVR 804*b*. The output OVR 810 (or the third OVR) is addressed as well at position "1". The position "1" is outputted by the first lane multiplexor 808*a* which has been selected for TRUE mode in this example. Also, in the TRUE mode during the first cycle, the second lane ALU 814*b* performs an addition operation since position "1" in the OVRs is a second lane position for the OVRs. For example, first lane positions of the OVRs are positions "0", "2", "4", etc. In such an example, the second lane positions of the OVRs are positions "1", "3", "5", etc. In the first example, while in the first lane of the VIRs and the first cycle of counter 806*a*, the addition operation is according to the first opcode 816*a* which is selected by the multiplexor 818 in the TRUE mode. The output of the opcode is output 819 which can be inputted into both the first lane and the second lane ALUs 814*a* and 814*b*. Specifically, as shown, the elements of input OVRs 804*a* and 804*b* at position "1" (elements "30" and "25") are inputted into the second lane ALU 814*b*. The second lane ALU 814 adds the elements of position "1" of OVRs 804*a* and 804*b* and outputs the result of the addition operation. The output of the addition operation is stored then at position "1" of the output OVR 810 as element "55" (A(1)+B(1)=C(1) or 30+25=55).

When the FALSE mode is selected by the multiplexor 808*a*, in the first cycle in the first lane, the output of "0" from the VIR_FALSE 802*a* is the address component used for accessing the input OVRs 804*a* and 804*b*. As a result, the input OVRs 804*a* and 804*b* are accessed for respective outputs of element "10" at position "0" of the input OVR 804*a* and element "20" at position "0" of input OVR 804*b*. As mentioned, position "0" in this example is a first lane position. The output OVR 810 (or the third OVR) is addressed as well at position "0". The position "0" is outputted by the first lane multiplexor 808*a* which has been selected for FALSE mode in this example. Also, in the FALSE mode the first lane ALU 814*a* performs subtraction operation, since position "0" in the OVRs is a first lane position for the OVRs. The subtraction operation is according to the second opcode 816*b* which is selected by the multiplexor 818 in the FALSE mode. The output of the opcode is output 819 which can be inputted into both the first lane and the second lane ALUs 814*a* and 814*b*. Specifically, as shown, the elements of input OVRs 804*a* and 804*b* at position "0" (elements "10" and "20") are inputted into the first lane ALU 814*a*. The first lane ALU 814*a* subtracts the element of position "0" of OVR 804*b* from the element of position "0" of OVR 804*a*, and outputs the result of the subtraction operation. The output of the subtraction operation is stored then at position "0" of the output OVR 810 as element "−10" (A(0)−B(0)=C(0) or 10−20=−10).

It is to be understood that the addition and subtraction operations illustrated in FIG. 8 are merely examples and that various operations can be performed on OVRs 804*a* and 804*b* according to the addressing by the VIRs 802*a* and 802*b*. Thus, the first opcode 816*a* can be an opcode for any arithmetic operation of an ALU, and the second opcode 816*b* can be an opcode for any arithmetic operation of an ALU as well.

As mentioned, the system 800 can implement method 600. For example, with the loading, by a vector load-store unit of a vector processor, one or more operand vectors (at steps 602 and 604), each vector of the one or more operand vectors can be stored in OVRs 804a and 804b. With the loading, by the vector load-store unit, of the first and second lane counts stored in respective counter registers, the counts can be stored in respective first and second lane counters 806a and 806b. With the loading, by the vector load-store unit of a vector processor, of the stored positions from VIRs (at steps 608a and 608b and steps 622a and 622b), the positions can be store in VIRs 802a and 802b. The executing of the first and the second operations in two lanes in steps 610 and 624 can be implemented by a combination of the OVRs, the VIRs, the multiplexors, and the ALUs depicted in FIG. 8. The storage of the results of the operations in two lanes (at steps 612 and 626) can occur at the output OVR 810. And, the loops in the method 600 can be controlled according to at least the lengths stored in the registers 812a and 812b.

The methods 300, 400, and 600 include just some of the many operations that can be implemented by the vector processors and systems described herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be partially provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. An apparatus comprising:
   a vector processor; and
   a vector load-store unit of the vector processor, wherein the vector load-store unit is configured to load one or more operand vectors, each vector of the one or more operand vectors being stored in a respective operand vector register;
   wherein the vector processor is configured to perform a conditional test operation on each element at a first lane index position of at least one of the loaded one or more operand vectors according to a first lane count stored in a first lane counter register; and
   wherein the vector processor is further configured to perform the conditional test operation on each element at a second lane index position of at least one of the loaded one or more operand vectors according to a second lane count stored in a second lane counter register.

2. The apparatus of claim 1, wherein the conditional test operations are configured to provide a vector of test results.

3. The apparatus of claim 2, wherein the vector processor is further configured to:
   store, in a first lane index position in a first vector index register for each true result of true results of the conditional test operation, a position of the true result in the vector of test results according to the first lane count; and
   store, in a first lane index position in a second vector index register for each false result of false results of the conditional test operation, a position of the false result in the vector of test results according to the first lane count.

4. The apparatus of claim 3, wherein the vector processor is further configured to:
   store, in a second lane index position in the first vector index register, a position of the true result in the vector of test results according to the second lane count; and
   store, in a second lane index position in the second vector index register, a position of the false result in the vector of test results according to the second lane count.

5. The apparatus of claim 4, wherein even positions in each operand vector are in a first lane and odd positions in each operand vector are in a second lane.

6. The apparatus of claim 3, wherein the vector processor is further configured to:
perform a first vector operation on first elements in the one or more operand vectors, the first elements identified by positions stored in the first vector index register; and
perform a second vector operation on second elements in the one or more operand vectors, the second elements identified by positions stored in the second vector index register.

7. The apparatus of claim 3, wherein the vector processor is further configured to:
load, by the vector load-store unit, a first input operand vector stored in a first input operand vector register;
load, by the vector load-store unit, a second input operand vector stored in a second input operand vector register,
load from the first vector index register, by the vector load-store unit, a stored position of respective elements of the loaded first and second input operand vectors according to the first lane count;
load from the first vector index register, by the vector load-store unit, a stored position of respective elements of the loaded first and second input operand vectors according to the second lane count; and
run a first operation over the respective elements of the loaded first and second input operand vectors according to the loaded positions from a first lane and a second lane in the first vector index register.

8. The apparatus of claim 7, wherein the vector processor is further configured to store a result of the first operation into an output operand vector register at positions that correspond to the loaded positions from the first and second lanes in the first vector index register.

9. The apparatus of claim 8, wherein the vector processor is further configured to:
continue to execute the first operation over respective elements of the loaded first and second input operand vectors according to loaded positions from the first lane and the second lane in the first vector index register and to store results of the first operation into the output operand vector register at the corresponding positions that match the loaded positions from the first vector index register, until the first lane count or the second lane count exceeds or equals a length of the first vector index register, and
reset the first lane count and the second lane count when the first lane count or the second lane count exceeds or equals the length of the first vector index register.

10. The apparatus of claim 9, wherein the first lane count and the second lane count are each incremented by two per loaded position from the first vector index register.

11. The apparatus of claim 9, wherein the vector processor is further configured to:
subsequent to resetting the first lane count and the second lane count:
load from the second vector index register, by the vector load-store unit, a stored position of respective elements of the loaded first and second input operand vectors according to the first lane count; and
load from the second vector index register, by the vector load-store unit, a stored position of respective elements of the loaded first and second input operand vectors according to the second lane count; and
run a second operation over the respective elements of the loaded first and second input operand vectors according to the loaded positions from the first lane and the second lane in the second vector index register.

12. The apparatus of claim 11, wherein the vector processor is further configured to:
continue to execute the second operation over the respective elements of the loaded first and second input operand vectors according to the loaded positions from the first lane and the second lane in the second vector index register and to store the results of the first operation into the output operand vector register at the corresponding positions that match the loaded positions from the second vector index register, until the first lane count or the second lane count exceeds or equals a length of the second vector index register.

13. The apparatus of claim 12, wherein the first lane count and the second lane count are each incremented by two per loaded position from the second vector index register.

14. The apparatus of claim 12, wherein the first operation comprises addition and the second operation comprises subtraction.

15. The apparatus of claim 1, wherein each respective operand vector register is a dual-access operand vector register.

16. A system, comprising:
a vector processor, configured to perform a conditional test operation on elements of a first loaded operand vector and a second loaded operand vector using two lanes within each of the first and second loaded operand vectors;
a first lane counter of the vector processor, configured to store a first lane count;
a second lane counter of the vector processor, configured to store a second lane count, and performance of the conditional test operation by the vector processor being according to the first lane count and the second lane count; and
one or more operand vector registers of the vector processor, each operand vector register configured to store an operand vector.

17. The system of claim 16, further comprising:
a first vector index register for each true result of true results of the conditional test operation, and
a second vector index register for each false result of false results of the conditional test operation, and wherein the vector processor is configured to:
load one or more operand vectors from the one or more operand vector registers,
perform the conditional test operation on each element at a first lane index position of at least one of the loaded one or more operand vectors according to the first lane count stored in the first lane counter; and
perform the conditional test operation on each element at a second lane index position of at least one of the loaded one or more operand vectors according to the second lane count stored in the second lane counter, the conditional test operations providing a vector of test results;
store, in a first lane index position in the first vector index register, a position of the true result in the vector of test results according to the first lane count;
store, in a first lane index position in the second vector index register, a position of the false result in the vector of test results according to the first lane count;

store, in a second lane index position in the first vector index register, a position of the true result in the vector of test results according to the second lane count; and store, in a second lane index position in the second vector index register, a position of the false result in the vector of test results according to the second lane count.

18. The system of claim 16, wherein even positions in each operand vector are in a first lane and odd positions in each operand vector are in a second lane.

19. The system of claim 16, wherein each operand vector register is a dual-access operand vector register.

20. A vector processor, comprising:

an operand scalar register configured to store an element to be used as input for an operation of an arithmetic logic unit;

a first operand vector register and a second operand vector register of a plurality of operand vector registers, each operand vector register configured to store elements of an operand vector to be used as input for an operation of the arithmetic logic unit, each operand vector register being a multiple-access operand vector register, the vector processor configured to either:
  perform a conditional test operation on the elements of the first operand vector register and the second operand vector register according to a plurality of lane counts for multiple-lane processing stored in a plurality of respective lane count registers, or
  perform the conditional test operation on the element stored in the operand scalar register and the elements of the first operand vector register according to the plurality of lane counts, and the conditional test operations providing a vector of test results.

* * * * *